United States Patent
Sutherland

(10) Patent No.: US 11,835,493 B2
(45) Date of Patent: Dec. 5, 2023

(54) METHODS, SYSTEMS, APPARATUSES, AND DEVICES FOR FACILITATING ASSESSMENT OF A PHYSICAL ASSET

(71) Applicant: Canetia Analytics, Cambridge, MA (US)

(72) Inventor: Graham Stuart Sutherland, Cambridge, MA (US)

(73) Assignee: CANETIA ANALYTICS, Cambridge, MA (US)

( * ) Notice: Subject to any disclaimer, the term of this patent is extended or adjusted under 35 U.S.C. 154(b) by 554 days.

(21) Appl. No.: 17/090,537

(22) Filed: Nov. 5, 2020

(65) Prior Publication Data

US 2021/0131935 A1 May 6, 2021

Related U.S. Application Data

(60) Provisional application No. 62/930,763, filed on Nov. 5, 2019.

(51) Int. Cl.
*G01N 3/56* (2006.01)
*H04W 4/029* (2018.01)
*G01N 3/06* (2006.01)

(52) U.S. Cl.
CPC .............. *G01N 3/56* (2013.01); *G01N 3/068* (2013.01); *H04W 4/029* (2018.02)

(58) Field of Classification Search
CPC .......... G01N 3/56; G01N 3/068; H04W 4/029
See application file for complete search history.

(56) References Cited

U.S. PATENT DOCUMENTS 3,686,038 A * 8/1972 Garth .................. H01M 6/162
429/199
4,901,575 A * 2/1990 Bohannan ........... G01M 5/0008
73/594

(Continued)

FOREIGN PATENT DOCUMENTS

CN 106289691 A * 1/2017 .............. G01M 7/02
CN 105737965 B * 11/2018 .............. G01H 9/00

(Continued)

OTHER PUBLICATIONS

Tae Keun Oh, Defect characterization in concrete elements using vibration analysis and imaging, https://www.ideals.illinois.edu/handle/2142/31160.

*Primary Examiner* — Jamel E Williams

(57) ABSTRACT

Disclosed herein is a system for facilitating assessment of a physical asset, in accordance with some embodiments. Accordingly, the system may include a device disposable on a location of the physical asset. Further, the device may include a sensor configured for generating an information. Further, the at least one device may include a communication interface communicatively coupled with the sensor. Further, the device may include a power source electrically coupled with the sensor and the communication interface. Further, the system may include an assessment system communicatively coupled with the device. Further, the assessment system may include a communication device configured for receiving the information and transmitting an assessment to a user device. Further, the assessment system may include a processing device communicatively coupled with the communication device. Further, the assessment system may include a storage device communicatively coupled with the processing device.

17 Claims, 15 Drawing Sheets

(56) References Cited

U.S. PATENT DOCUMENTS

| | | |
|---|---|---|
| 6,386,038 B1 | 5/2002 | Lewis, III et al. |
| 8,731,807 B2 * | 5/2014 | Friedlander ............... G08G 1/00 |
| | | 701/117 |
| 2002/0161751 A1 * | 10/2002 | Mulgund ............... H04L 41/024 |
| 2004/0078170 A1 * | 4/2004 | Di Marzio ............... G08C 17/02 |
| | | 702/188 |
| 2006/0287835 A1 * | 12/2006 | Sheth ................... G01N 21/952 |
| | | 702/35 |
| 2007/0033277 A1 * | 2/2007 | Yukawa ............. G05B 23/0267 |
| | | 709/224 |
| 2007/0114422 A1 * | 5/2007 | Berkcan ................. G01M 5/00 |
| | | 250/358.1 |
| 2010/0238027 A1 * | 9/2010 | Bastianini ............... H04Q 9/00 |
| | | 702/34 |
| 2015/0019267 A1 * | 1/2015 | Prieto .................. G06Q 10/067 |
| | | 705/348 |
| 2016/0266086 A1 * | 9/2016 | Von Herzen ....... G01N 29/2481 |
| 2018/0129211 A1 * | 5/2018 | Vidyadharan ......... B64C 39/024 |
| 2018/0164093 A1 * | 6/2018 | Westcott ............ G01M 5/0008 |
| 2018/0275100 A1 * | 9/2018 | Sutherland ........... G05D 7/0676 |
| 2019/0017896 A1 * | 1/2019 | Whelan ............... G01M 5/0033 |

FOREIGN PATENT DOCUMENTS

| | | | |
|---|---|---|---|
| WO | WO-0197159 A1 * | 12/2001 | ......... G01M 17/025 |
| WO | WO2001097159 | 12/2001 | |

\* cited by examiner

METHODS, SYSTEMS, APPARATUSES, AND DEVICES FOR FACILITATING ASSESSMENT OF A PHYSICAL ASSET

The current application claims a priority to the U.S. Provisional Patent application Ser. No. 62/930,763 filed on Nov. 5, 2019.

FIELD OF THE INVENTION

Generally, the present disclosure relates to the field of static structures. More specifically, the present disclosure relates to methods, systems, apparatuses, and devices for facilitating assessment of a physical asset.

BACKGROUND OF THE INVENTION

A device to monitor and notify of irregular change of behavior of a structure is in demand A stress event may be caused by the application of a force (mass) to a structural member associated with the structure for a duration of time that stimulates the structural member to vibrate and thereby transmit sounds corresponding to the impact of the force. Further, structures exposed to repeated loads (e.g., temporary loads, of short duration, or moving) are susceptible to defects caused by fatigue of the materials used; such defects adversely affect the load-bearing capabilities (i.e., the structural integrity of the structural member). Such defects may be localized structural defects such as cracks and fatigue fractures.

Similarly, the structures that are exposed to weather over extended periods are subject to defects or failures caused by corrosion or oxidation or general changes to the mass or their microstructure resulting from, for example, defective materials, defective material processing or manufacturing techniques, defective maintenance, excessive stress events overuse, and the like.

Accordingly, the structural members are periodically inspected to discover any defects that might affect structural integrity before the structure becomes unsafe for its intended purpose so that the member can be repaired, replaced, or taken out of service. Further, visual inspections and conventional diagnostic measurements are inadequate to evaluate the safety of the structure, particularly to reliably detect fatigue cracks, fractures, corrosion or oxidation, or other defects that are invisible to the human eye. However, current technologies have been of limited use in the structures because of the inherent complexity and expense of implementation. Further, current technologies are limited to the structures of certain material compositions and cannot be broadly applied to support members of different compositions. Further, statutory inspection periods for certain types of assets, current technologies may not as effective in determining failure likelihood because of the nature of the inspection, primarily relying on a manual, visual, or external check.

Therefore, there is a need for improved methods, systems, apparatuses, and devices for facilitating the assessment of a physical asset that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a system for facilitating assessment of a physical asset, in accordance with some embodiments. Accordingly, the system may include at least one device disposable on at least one location of the physical asset. Further, the at least one device may include at least one sensor configured for generating at least one information associated with at least one characteristic of the physical asset. Further, the at least one device may include at least one communication interface communicatively coupled with the at least one sensor. Further, the at least one communication interface may be configured for communicating with an assessment system using at least one communication channel. Further, the at least one communication interface may be configured for transmitting the at least one information to the assessment system. Further, the at least one device may include at least one power source electrically coupled with the at least one sensor and the at least one communication interface. Further, the at least one power source may be configured for electrically powering the at least one sensor and the at least one communication interface. Further, the system may include the assessment system communicatively coupled with the at least one device. Further, the assessment system may include a communication device configured for receiving the at least one information from the at least one communication interface. Further, the communication device may be configured for transmitting an assessment to at least one user device. Further, the assessment system may include a processing device communicatively coupled with the communication device. Further, the processing device may be configured for analyzing the at least one information. Further, the processing device may be configured for generating the assessment of the physical asset based on the analyzing of the at least one information. Further, the assessment system may include a storage device communicatively coupled with the processing device. Further, the storage device may be configured for storing the at least one information and the assessment.

Further disclosed herein is a system for facilitating assessment of a physical asset, in accordance with some embodiments. Accordingly, the system may include at least one device disposable on at least one location of the physical asset. Further, the at least one device may include at least one sensor configured for generating at least one information associated with at least one characteristic of the physical asset. Further, the at least one device may include at least one environment sensor configured for generating at least one environmental information based on at least one environmental condition associated with an environment of the physical asset. Further, the at least one device may include at least one communication interface communicatively coupled with the at least one sensor and the at least one environment sensor. Further, the at least one communication interface may be configured for communicating with an assessment system using at least one communication channel. Further, the at least one communication interface may be configured for transmitting the at least one information and the at least one environmental information to the assessment system. Further, the at least one device may include at least one power source electrically coupled with the at least one sensor, the at least one environment sensor, and the at least one communication interface. Further, the at least one power source may be configured for electrically powering the at least one sensor, the at least one environment sensor, and the at least one communication interface. Further, the system may include the assessment system communicatively coupled with the at least one device. Further, the assessment system may include a communication device configured for receiving the at least one information and the at least one environmental information from the at least one communication interface. Further, the communication device may be configured for transmitting an assessment to at least one user device. Further, the assessment system may include a processing device communicatively coupled with the communication device. Further, the processing device may be configured for analyzing the at least one information and the at least one environmental information. Further, the processing device may be configured for generating the assessment of the physical asset based on the analyzing of the at least one information and the at least one environmental information. Further, the assessment system may include a storage device communicatively coupled with the processing device. Further, the storage device may be configured for storing the at least one information and the assessment.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
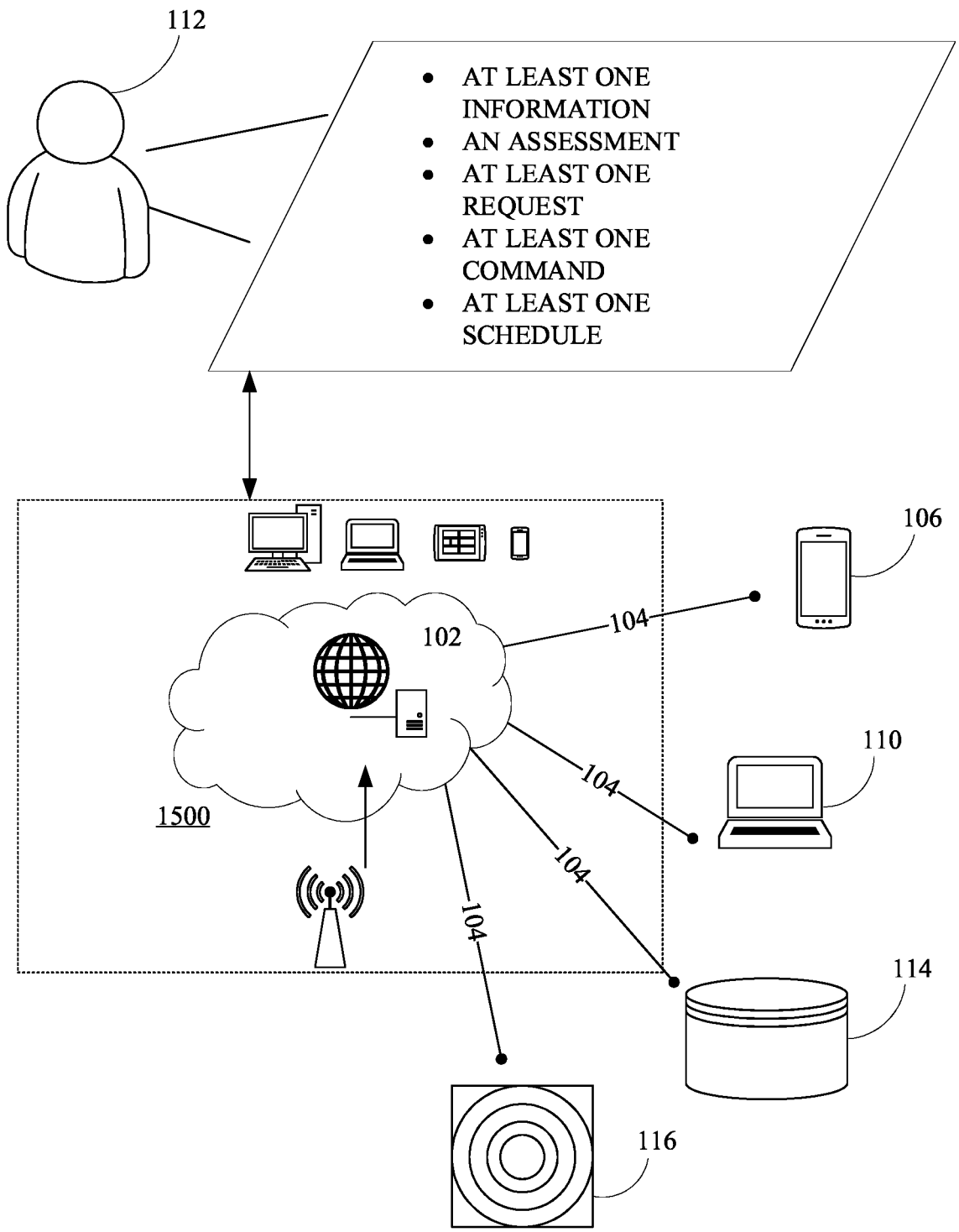
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure.

Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating assessment of a physical asset, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods, systems, apparatuses, and devices for facilitating assessment of a physical asset. Further, the disclosed system may include a failure detection system for detecting failures in physical assets such as bridges, railway tracks (rails) and structures, to provide information on asset conditions and advance warning of structural failure. Further, the disclosed system uses a low-cost "internet of things" device, a "fast Fourier transform" (FFT) algorithm, a neural network (a convolutional neural network (CNN) or recurrent neural network (RNN)) that will learn the specific "normal" response of each structure, and structure maintenance records or inspection reports. Further, the disclosed system may provide a work order so that an asset inspection can take place. Further, the disclosed system may be applied in fixed civil assets like bridges, electricity pylons, oil pipelines, rail tracks, etc. Further, the disclosed system may be used on moving platforms (e.g., trains, automobiles, airplanes, ships, or installations such as oil platforms). Further, the failure detection system may include a data input system, a network, an assessment system, an output system. The data input system can be communicatively connected to an asset system via a network. The assessment system may be configured to analyze the characteristic information of a structure and communicatively connected via the network to the output system. The data input system may include a microphone, a recording device, an internet access device, a laser vibration sensor, a laser interferometer sensor, a wideband audio sensor, historical maintenance data records, and theoretical verification FEA model. For electrical conductivity measurements, the data input system may also include an electronic device capable of periodically injecting a small (several volts) alternating current signal into the asset so that the conductivity may be recorded. Further, an electrical current amplitude of the signal may be measured and represented as a time-varying response that may be digitized, recorded, and passed to a neural network for analysis. This recording and internet access system may be a low-cost "internet of things" device. The IoT devices may be equipped with multiple radio technologies such as Bluetooth®, Bluetooth® Low Energy "BLE", ZigBee®, Wi-Fi or cellular (2G, 3G and 4G, and 5G). The IoT devices may be configured to send temperature, barometric pressure, and other environmental information.

In some embodiments, the disclosed system may include a vibration sensor comprising one or more metallic strips which move between electrical contacts. The metallic strips may be of differing thickness. When the vibration sensor containing the metallic strips is subject to vibration, the metallic strips continually make and break contact with the electrical contacts. The resultant signal produced by the metallic strips of the vibration sensor can be passed to a neural network, via the IoT device described above, to determine trends in data and to extract features in the manner described.

In another embodiment, the disclosed system may be configured to gain insight into the response to shock or vibration of a given physical asset class. For example, the disclosed system may include a device with the capacity to deliver a known impulse to a physical asset without damaging the asset. The device may comprise a weight of several kg attached to a screw-type shaft against the force of a spring. The device may include a cylindrical enclosure attached to the asset. As the screw turns, the weight retracts. At the full length of travel, the spring is fully compressed. The device may further include a clamp that may release the weight so that it can move freely at speed toward the other end of the cylindrical enclosure. The weight strikes an internal plate at the other end of the cylindrical enclosure, and the resulting shock wave is transmitted into the attached structure. One or more of the above-described recording devices will record and transmit the data in the manner described above. The data are analyzed using the neural network arrangement as described. This data can be used for verification of the models using the minimax network game tree structure as described. The data obtained from this process can be fed back into the training models for that asset class to improve the reliability of the assessment. Further, the disclosed system may solve the problems associated with conventional detection methods or systems through an innovative configuration of recording devices and neural networks. Further, the disclosed system may detect failures in large physical assets to provide information on asset condition and to reliably predict advance warning of structural failure.

In an embodiment, the disclosed system uses a Radar Device, operating from a frequency of 2 GHz to 10 GHz to either reflect radio waves emanating from the device to a structure or object, back toward the device for analysis as described or toward the object or structure and through it, by which the transmission through the structure may be analyzed. The transmission or absorption of the radar signal may be used to classify the type or internal structure of a material or component. The radar device may be portable, allowing for the small-scale investigation of substances, components, or structures. Similarly, an audio input sonic device (e.g. microphone) or 'geophone' may also be used.

Referring now to figures, FIG. 1 is an illustration of an online platform 100 consistent with various embodiments of the present disclosure. By way of non-limiting example, the online platform 100 for facilitating assessment of a physical asset may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1500.

Figure 2:
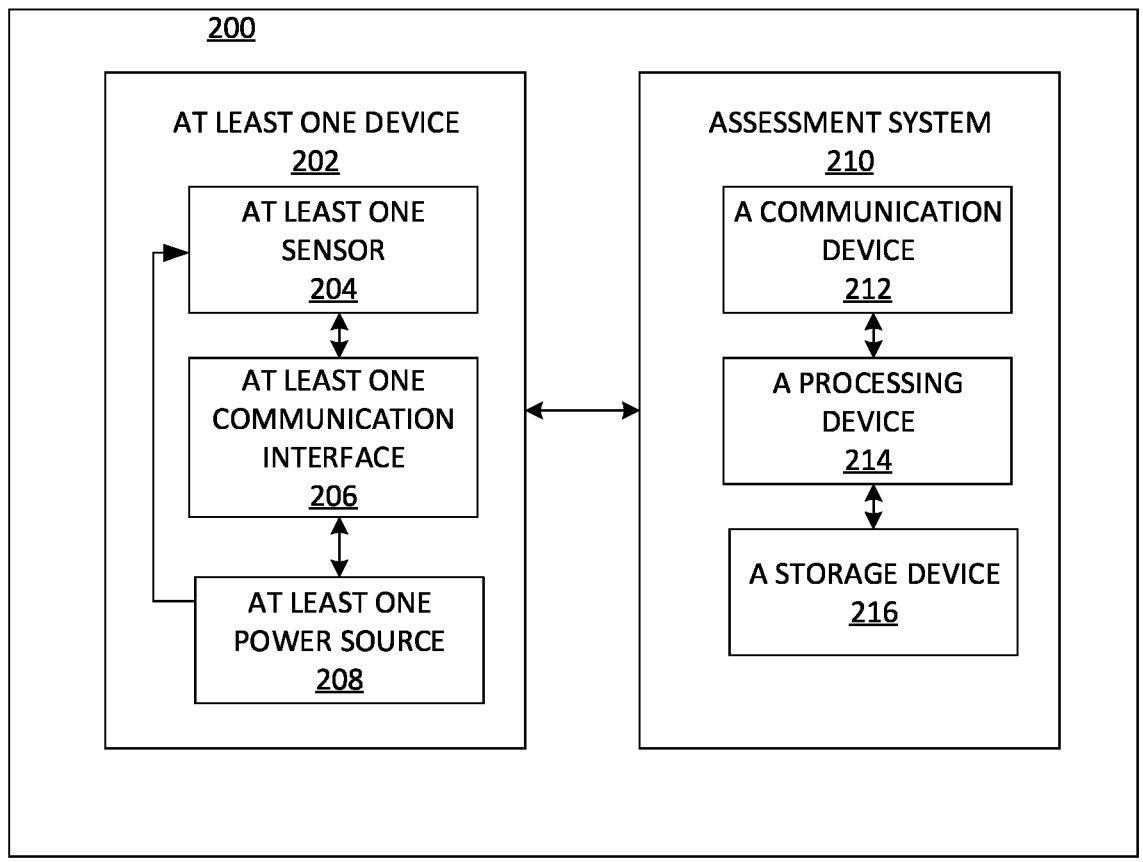
FIG. 2 is a flowchart of a system for facilitating assessment of a physical asset, in accordance with some embodiments.

FIG. 2 is a flowchart of a system 200 for facilitating assessment of a physical asset, in accordance with some embodiments. Accordingly, the system 200 may include at least one device 202 disposable on at least one location of the physical asset. Further, the at least one device 202 may include at least one sensor 204 configured for generating at least one information associated with at least one characteristic of the physical asset. Further, the at least one characteristic may include at least one of at least one structural characteristic, at least one compositional characteristic, at least one mechanical characteristic, at least one electrical characteristic, at least one magnetic characteristic, etc. Further, the at least one device 202 may include at least one communication interface 206 communicatively coupled with the at least one sensor 204. Further, the at least one communication interface 206 may be configured for communicating with an assessment system 210 using at least one communication channel. Further, the at least one communication interface 206 may be configured for transmitting the at least one information to the assessment system 210. Further, the at least one device 202 may include at least one power source 208 electrically coupled with the at least one sensor 204 and the at least one communication interface 206. Further, the at least one power source 208 may be configured for electrically powering the at least one sensor 204 and the at least one communication interface 206. Further, the at least one device 202 may be an IoT device.

Further, the system 200 may include the assessment system 210 communicatively coupled with the at least one device 202. Further, the assessment system 210 may include a communication device 212 configured for receiving the at least one information from the at least one communication interface 206. Further, the communication device 212 may be configured for transmitting an assessment to at least one user device. Further, the assessment system 210 may include a processing device 214 communicatively coupled with the communication device 212. Further, the processing device 214 may be configured for analyzing the at least one information. Further, the processing device 214 may be configured for generating the assessment of the physical asset based on the analyzing of the at least one information. Further, the assessment may include at least one of "Structural Failure," "Good Condition" and "Maintenance Reqd". Further, the assessment system 210 may include a storage device 216 communicatively coupled with the processing device 214. Further, the storage device 216 may be configured for storing the at least one information and the assessment.

Figure 3:
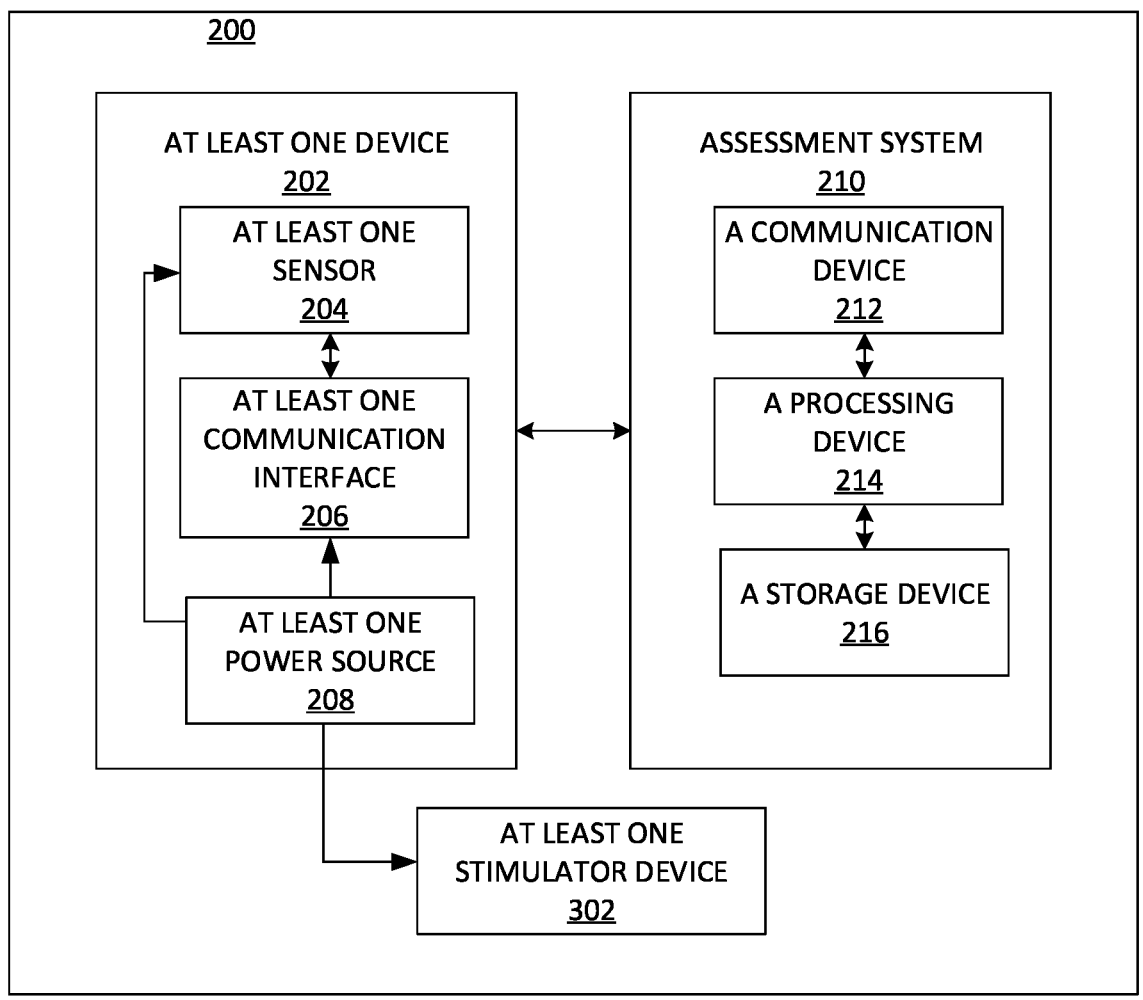
FIG. 3 is a block diagram of the system for facilitating assessment of the physical asset, in accordance with some embodiments.

In further embodiments, the system 200 may include at least one stimulator device 302 (as shown in FIG. 3) configured for generating at least one stimulus. Further, the at least one stimulator device 302 may be electrically coupled to the at least one power source 208. Further, the at least one power source 208 may be configured for powering the at least one stimulator device 302. Further, the at least one stimulator device 302 may be configured for delivering the at least one stimulus to the physical asset based on the generating of the at least one stimulus. Further, the physical asset generates at least one response based on the at least one stimulus and the at least one characteristic. Further, the at least one response may include at least one vibration generated by the physical asset. Further, the at least one vibration may be associated with at least one vibration pattern. Further, the at least one vibration pattern of the at least one vibration may correspond to the at least one characteristic and the at least one stimulus. Further, the generating of the at least one information may be based the at least one response. Further, the at least one information may be associated with the at least one response.

Further, in some embodiments, the communication device 212 may be communicatively coupled with the at least one stimulator device 302. Further, the communication device 212 may be configured for receiving at least one request from at least one first user device. Further, the communication device 212 may be configured for transmitting at least one command to the at least one stimulator device 302. Further, the generating of the at least one stimulus may be based on the at least one command. Further, the processing device 214 may be configured for analyzing the at least one request. Further, the processing device 214 may be configured for generating the at least one command based on the analyzing of the at least one request.

Further, in some embodiments, the communication device 212 may be communicatively coupled with the at least one stimulator device 302. Further, the communication device 212 may be configured for transmitting at least one schedule to the at least one stimulator device 302. Further, the generating of the at least one stimulus may be based on the at least one schedule. Further, the storage device 216 may be configured for retrieving the at least one schedule.

Figure 4:
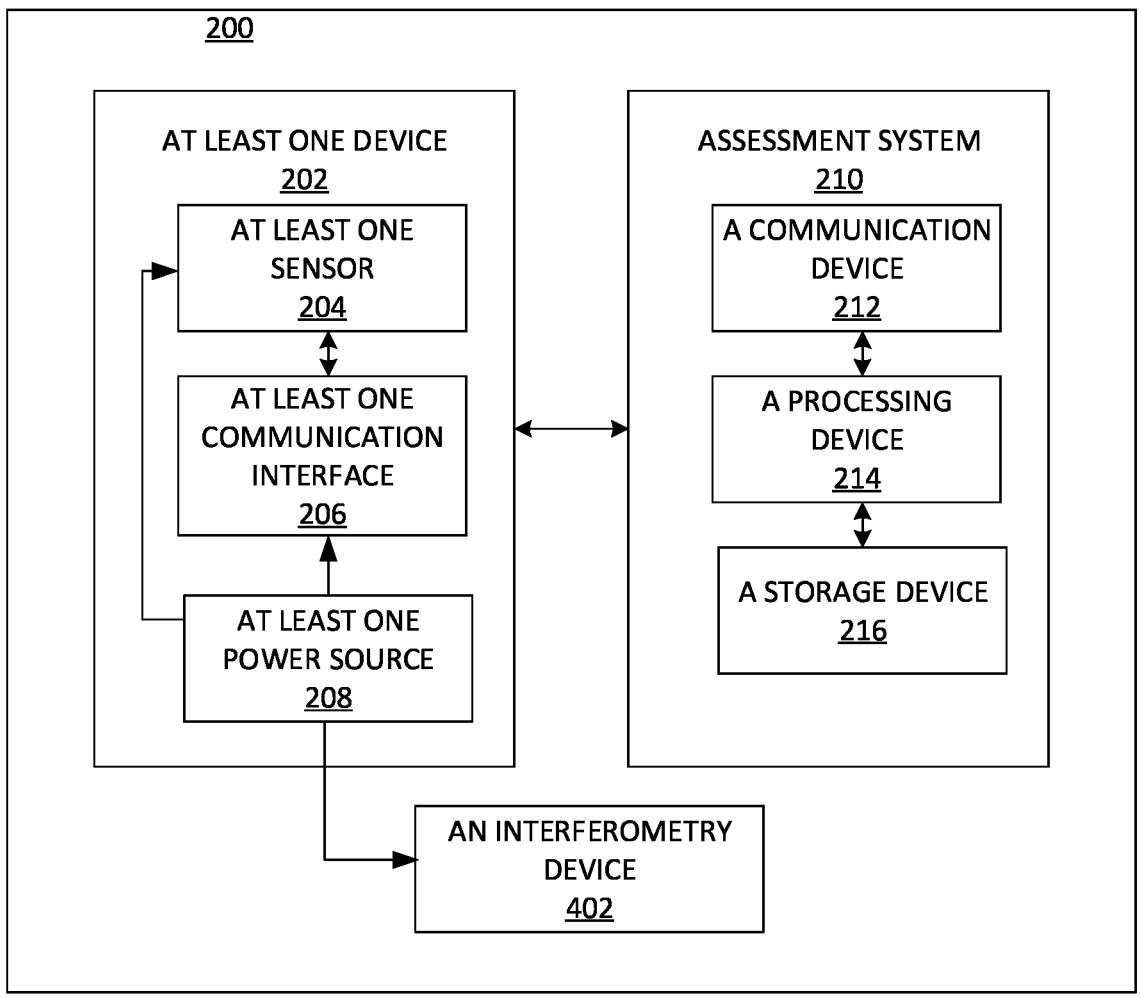
FIG. 4 is a block diagram of the system for facilitating assessment of the physical asset, in accordance with some embodiments.

In further embodiments, the system 200 may include an interferometry device 402 (as shown in FIG. 4) configured for generating two beams of light. Further, the interferometry device 402 may be electrically coupled to the at least one power source 208. Further, the at least one power source 208 may be configured for powering the interferometry device 402. Further, the two beams comprise a first beam and a second beam. Further, the first beam may be directed towards the at least one sensor 204 through a first path. Further, the second beam may be directed towards the at least one sensor 204 through a second path. Further, the first path and the second path are dissimilar. Further, the first beam and the second beam converges on the at least one sensor 204 forming at least one interference fringe. Further, the at least one interference fringe corresponds to at least one response generated by the physical asset based on at least one stimulus receivable by the physical asset and the at least one characteristic of the physical asset. Further, the at least one response may include at least one vibration generated by the physical asset. Further, the generating of the at least one information may be based on the forming of the at least one interference fringe.

Figure 5:
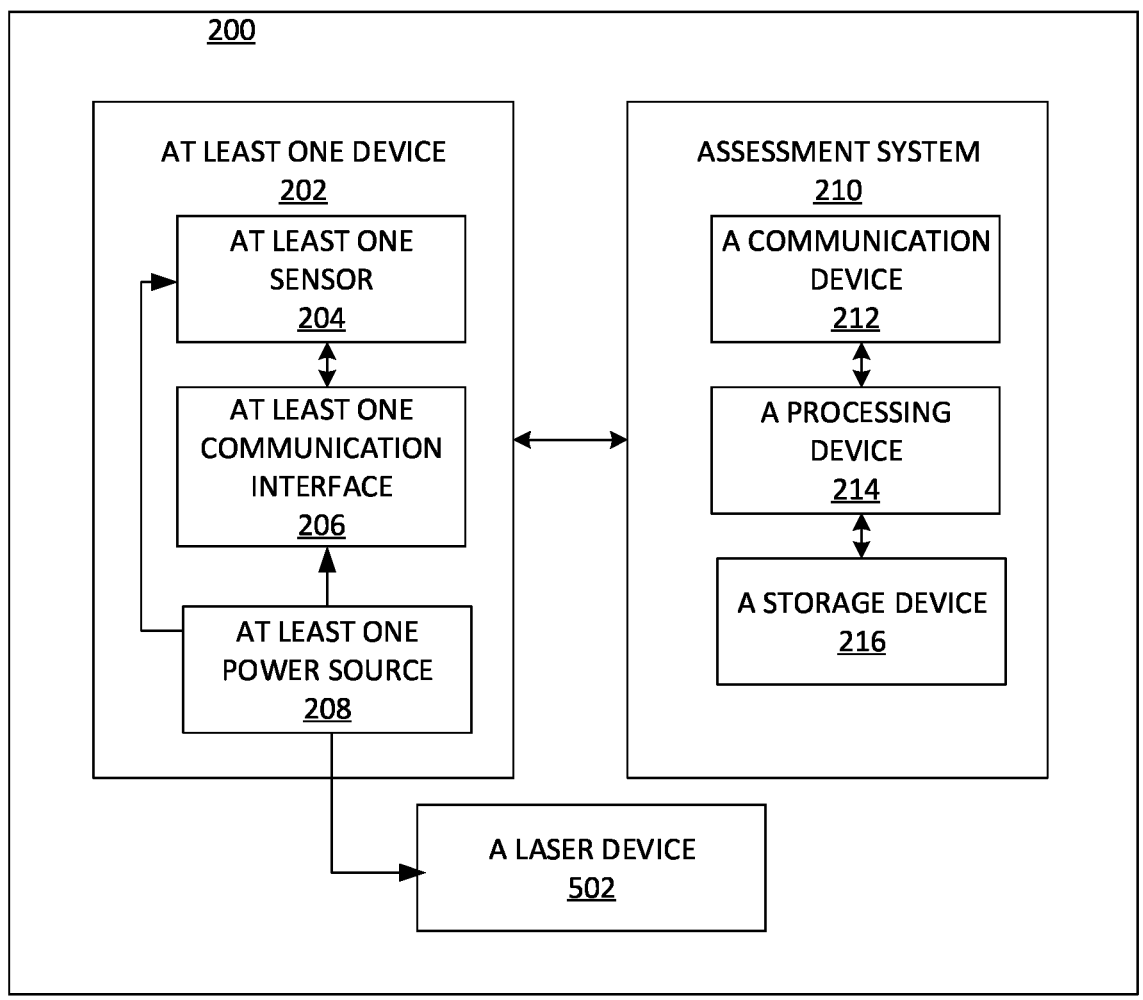
FIG. 5 is a block diagram of the system for facilitating assessment of the physical asset, in accordance with some embodiments.

In further embodiments, the system 200 may include a laser device 502 (as shown in FIG. 5) configured for generating a laser beam. Further, the laser device 502 may be electrically coupled to the at least one power source 208. Further, the at least one power source 208 may be configured for powering the laser device 502. Further, the laser beam may be directed towards the at least one sensor 204. Further, the laser beam illuminates the at least one sensor 204 forming at least one illumination pattern. Further, the at least one illumination pattern corresponds to at least one response generated by the physical asset based on at least one stimulus receivable by the physical asset and the at least one characteristic of the physical asset. Further, the at least one response may include at least one vibration generated by the physical asset. Further, the generating of the at least one information may be based on the forming of the at least one illumination pattern.

Figure 6:
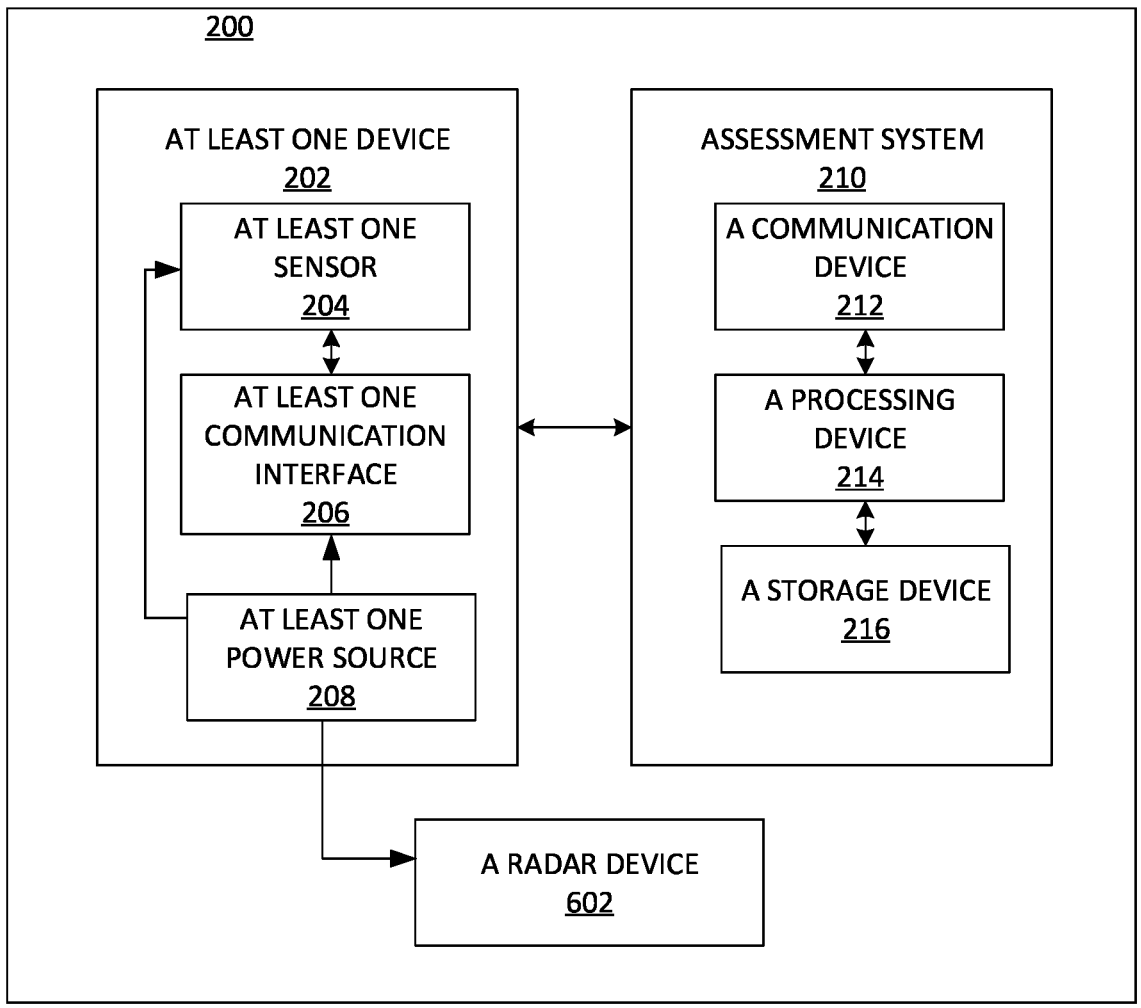
FIG. 6 is a block diagram of the system for facilitating assessment of the physical asset, in accordance with some embodiments.

In further embodiments, the system 200 may include a radar device 602 (as shown in FIG. 6) configured for generating radio waves. Further, the radar device 602 may be electrically coupled to the at least one power source 208. Further, the at least one power source 208 may be configured for powering the radar device 602. Further, the radar device 602 may be configured for directing the radio waves towards the physical asset. Further, the physical asset generates first radio waves by at least one of transmitting and absorbing at least one portion of the radio waves based on at least one structural characteristic of the at least one characteristic of the physical asset. Further, the first radio waves are directed towards the at least one sensor 204. Further, the generating of the at least one information may be based on the first radio waves.

Further, in some embodiments, the analyzing of the at least one information may be based on at least one artificial intelligence model. Further, the at least one artificial intelligence model may be configured for determining a probability for each assessment option of a plurality of assessment options associated with the physical asset. Further, the plurality of assessment options may include at least one of "Structural Failure," "Good Condition" and "Maintenance Reqd". Further, the generating of the assessment may be based on the determining of the probability of the each assessment option. Further, the storage device 216 may be configured for storing the at least one artificial intelligence model.

Further, in some embodiments, the at least one information may include at least one asset identifier. Further, the storage device 216 may be configured for retrieving at least one historical maintenance information based on the at least one asset identifier. Further, the at least one historical maintenance information may be associated with at least one historical response generated by the physical asset. Further, the processing device 214 may be configured for analyzing the at least one historical maintenance information. Further, the generating of the assessment may be based on the analyzing of the at least one historical maintenance information.

Further, in some embodiments, the at least one device 202 may be associated with at least one geographical location. Further, the at least one geographical location may be related with at least one geographical area. Further, the at least one geographical area may include a county, a city, etc. Further, at least one response generated by the physical asset based on at least one stimulus receivable by the physical asset and the at least one characteristic may include at least one environmental response generated by at least one environmental component of an environment of the physical asset. Further, the at least one environmental component may be associated the at least one geographical location. Further, the assessment may include an environmental assessment of the at least one geographical location.

Figure 7:
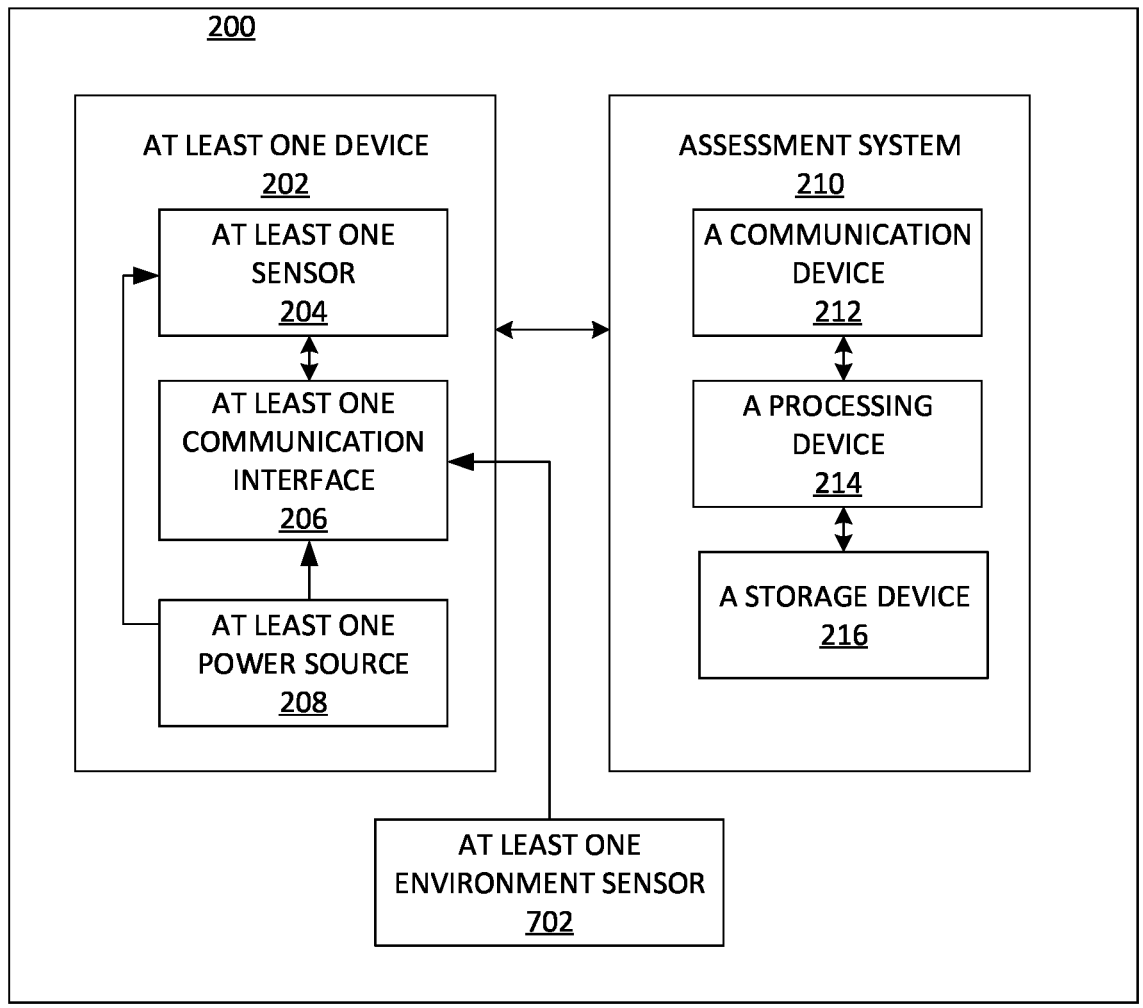
FIG. 7 is a block diagram of the system for facilitating assessment of the physical asset, in accordance with some embodiments.

Further, in some embodiments, the at least one device 202 may include at least one environment sensor 702 (as shown in FIG. 7). Further, the at least one environment sensor 702 may be communicatively coupled with the at least one communication interface 206. Further, the at least one environment sensor 702 may be configured for generating at least one environmental information based on at least one environmental condition associated with an environment of the physical asset. Further, the at least one environmental condition may include at least one meteorological parameter. Further, the at least one meteorological parameter may include temperature, relative humidity (RH), evapotranspiration (ET), wind speed, solar radiation, precipitation, etc. Further, the at least one communication interface 206 may be configured for transmitting the at least one environmental information to the assessment system 210. Further, the communication device 212 may be configured for receiving the at least one environmental information from the at least one communication interface 206. Further, the processing device 214 may be configured for analyzing the at least one environmental information. Further, the generating of the assessment may be based on the analyzing of the at least one environmental information.

Further, in some embodiments, the at least one sensor 204 may be configured for detecting at least one event associated with the physical asset. Further, the generating of the at least one information may be based on the detecting. Further, the at least one information may include at least one of at least one spatial identifier of the at least one event and at least one temporal identifier of the at least one event.

Further, in some embodiments, the communication device 212 may be configured for receiving at least one first request from at least one second user device. Further, the communication device 212 may be configured for transmitting at least one first command to the at least one communication interface 206. Further, the generating of the at least one information may be based on the at least one first command. Further, the processing device 214 may be configured for analyzing the at least one first request. Further, the processing device 214 may be configured for generating the at least one first command based on the analyzing of the at least one first request.

FIG. 3 is a block diagram of the system 200 for facilitating assessment of the physical asset, in accordance with some embodiments.

FIG. 4 is a block diagram of the system 200 for facilitating assessment of the physical asset, in accordance with some embodiments.

FIG. 5 is a block diagram of the system 200 for facilitating assessment of the physical asset, in accordance with some embodiments.

FIG. 6 is a block diagram of the system 200 for facilitating assessment of the physical asset, in accordance with some embodiments.

FIG. 7 is a block diagram of the system 200 for facilitating assessment of the physical asset, in accordance with some embodiments.

Figure 8:
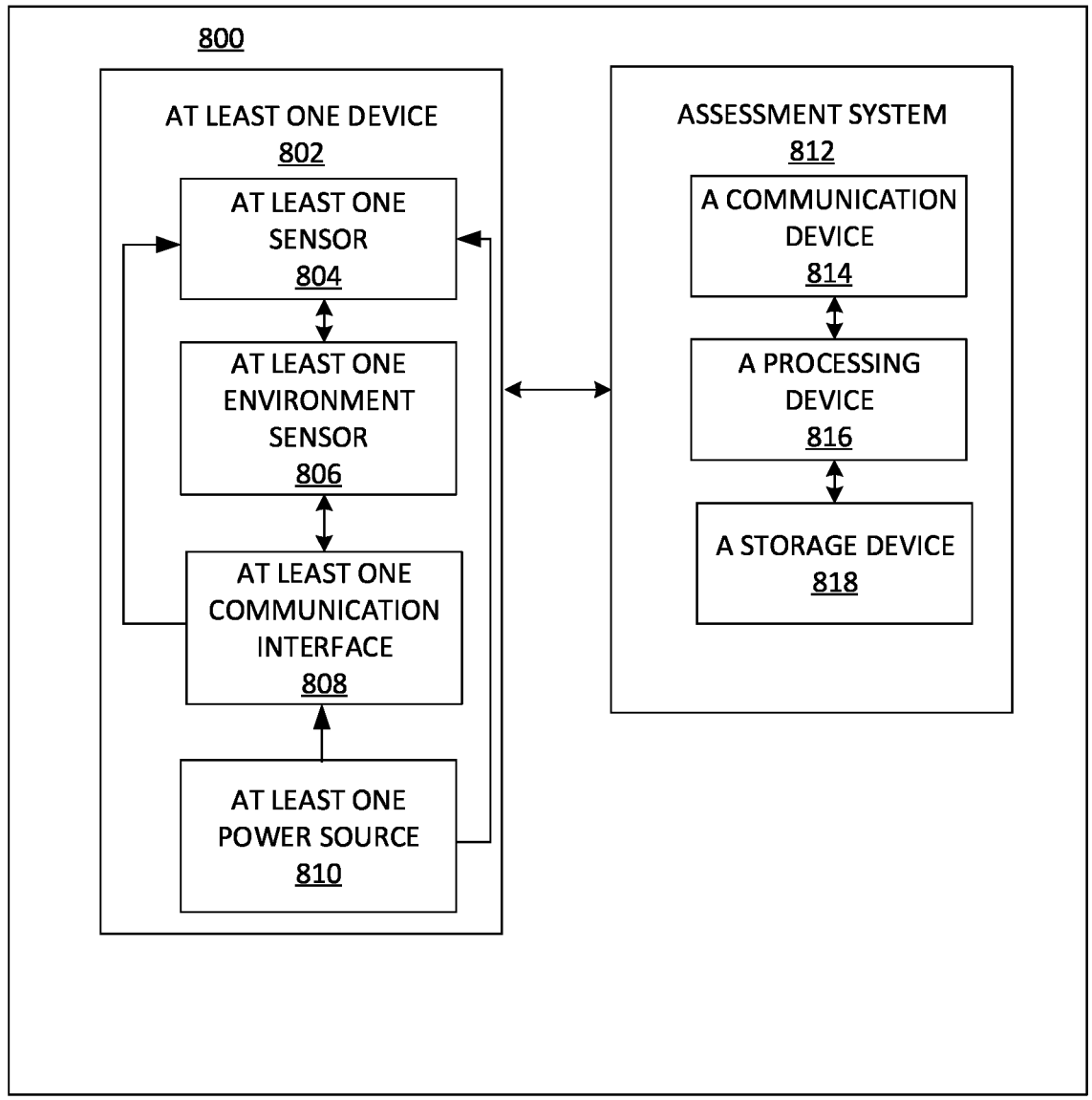
FIG. 8 is a block diagram of a system for facilitating assessment of a physical asset, in accordance with some embodiments.

FIG. 8 is a block diagram of a system 800 for facilitating assessment of a physical asset, in accordance with some embodiments. Accordingly, the system 800 may include at least one device 802 disposable on at least one location of the physical asset. Further, the at least one device 802 may include at least one sensor 804 configured for generating at least one information associated with at least one characteristic of the physical asset. Further, the at least one characteristic may include at least one of at least one structural characteristic, at least one compositional characteristic, at least one mechanical characteristic, at least one electrical characteristic, at least one magnetic characteristic, etc. Further, the at least one device 802 may include at least one environment sensor 806 configured for generating at least one environmental information based on at least one environmental condition associated with an environment of the physical asset. Further, the at least one device 802 may include at least one communication interface 808 communicatively coupled with the at least one sensor 804 and the at least one environment sensor 806. Further, the at least one communication interface 808 may be configured for communicating with an assessment system 812 using at least one communication channel. Further, the at least one communication interface 808 may be configured for transmitting the at least one information and the at least one environmental information to the assessment system 812. Further, the at least one device 802 may include at least one power source 810 electrically coupled with the at least one sensor 804, the at least one environment sensor 806, and the at least one communication interface 808. Further, the at least one power source 810 may be configured for electrically powering the at least one sensor 804, the at least one environment sensor 806, and the at least one communication interface 808.

Further, the system 800 may include the assessment system 812 communicatively coupled with the at least one device 802. Further, the assessment system 812 may include a communication device 814 configured for receiving the at least one information and the at least one environmental information from the at least one communication interface 808. Further, the communication device 814 may be configured for transmitting an assessment to at least one user device. Further, the assessment system 812 may include a processing device 816 communicatively coupled with the communication device 814. Further, the processing device 816 may be configured for analyzing the at least one information and the at least one environmental information. Further, the processing device 816 may be configured for generating the assessment of the physical asset based on the analyzing of the at least one information and the at least one environmental information. Further, the assessment system 812 may include a storage device 818 communicatively coupled with the processing device 816. Further, the storage device 818 may be configured for storing the at least one information and the assessment.

Figure 9:
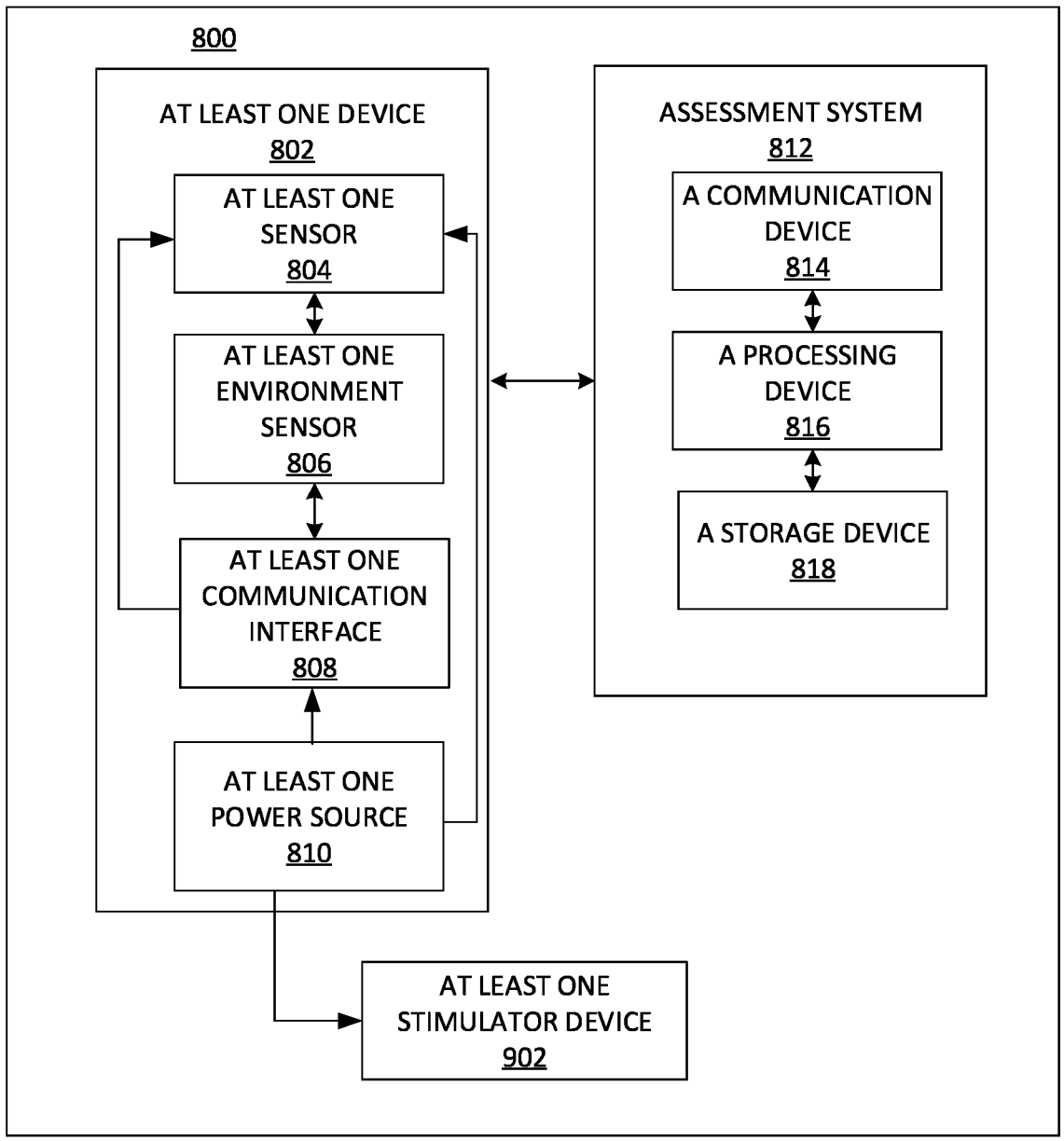
FIG. 9 is a block diagram of the system for facilitating assessment of the physical asset, in accordance with some embodiments.

In further embodiments, the system 800 may include at least one stimulator device 902 (as shown in FIG. 9) configured for generating at least one stimulus. Further, the at least one stimulator device 902 may be configured for delivering the at least one stimulus to the physical asset based on the generating of the at least one stimulus. Further, the physical asset generates at least one response based on the at least one stimulus and the at least one characteristic. Further, the generating of the at least one information may be based the at least one response. Further, the at least one information may be associated with the at least one response.

Further, in some embodiments, the communication device 814 may be communicatively coupled with the at least one stimulator device 902. Further, the communication device 814 may be configured for receiving at least one request from at least one first user device. Further, the communication device 814 may be configured for transmitting at least one command to the at least one stimulator device 902. Further, the generating of the at least one stimulus may be based on the at least one command. Further, the processing device 816 may be configured for analyzing the at least one request. Further, the processing device 816 may be configured for generating the at least one command based on the analyzing of the at least one request.

Further, in some embodiments, the communication device 814 may be communicatively coupled with the at least one stimulator device 902. Further, the communication device 814 may be configured for transmitting at least one schedule to the at least one stimulator device 902. Further, the generating of the at least one stimulus may be based on the at least one schedule. Further, the storage device 818 may be configured for retrieving the at least one schedule.

Further, in some embodiments, the at least one information may include at least one asset identifier. Further, the storage device 818 may be configured for retrieving at least one historical maintenance information based on the at least one asset identifier. Further, the at least one historical maintenance information may be associated with at least one historical response generated by the physical asset. Further, the processing device 816 may be configured for analyzing the at least one historical maintenance information. Further, the generating of the assessment may be based on the analyzing of the at least one historical maintenance information.

Further, in some embodiments, the at least one device 802 may be associated with at least one geographical location. Further, at least one response generated by the physical asset based on at least one stimulus receivable by the physical asset and the at least one characteristic may include at least one environmental response generated by at least one environmental component of the environment of the physical asset. Further, the at least one environmental component may be associated the at least one geographical location. Further, the assessment may include an environmental assessment of the at least one geographical location.

Further, in some embodiments, the communication device 814 may be configured for receiving at least one first request from at least one second user device. Further, the communication device 814 may be configured for transmitting at least one first command to the at least one communication interface 808. Further, the generating of the at least one information may be based on the at least one first command. Further, the processing device 816 may be configured for analyzing the at least one first request. Further, the processing device 816 may be configured for generating the at least one first command based on the analyzing of the at least one first request.

FIG. 9 is a block diagram of the system 800 for facilitating assessment of the physical asset, in accordance with some embodiments.

Figure 10:
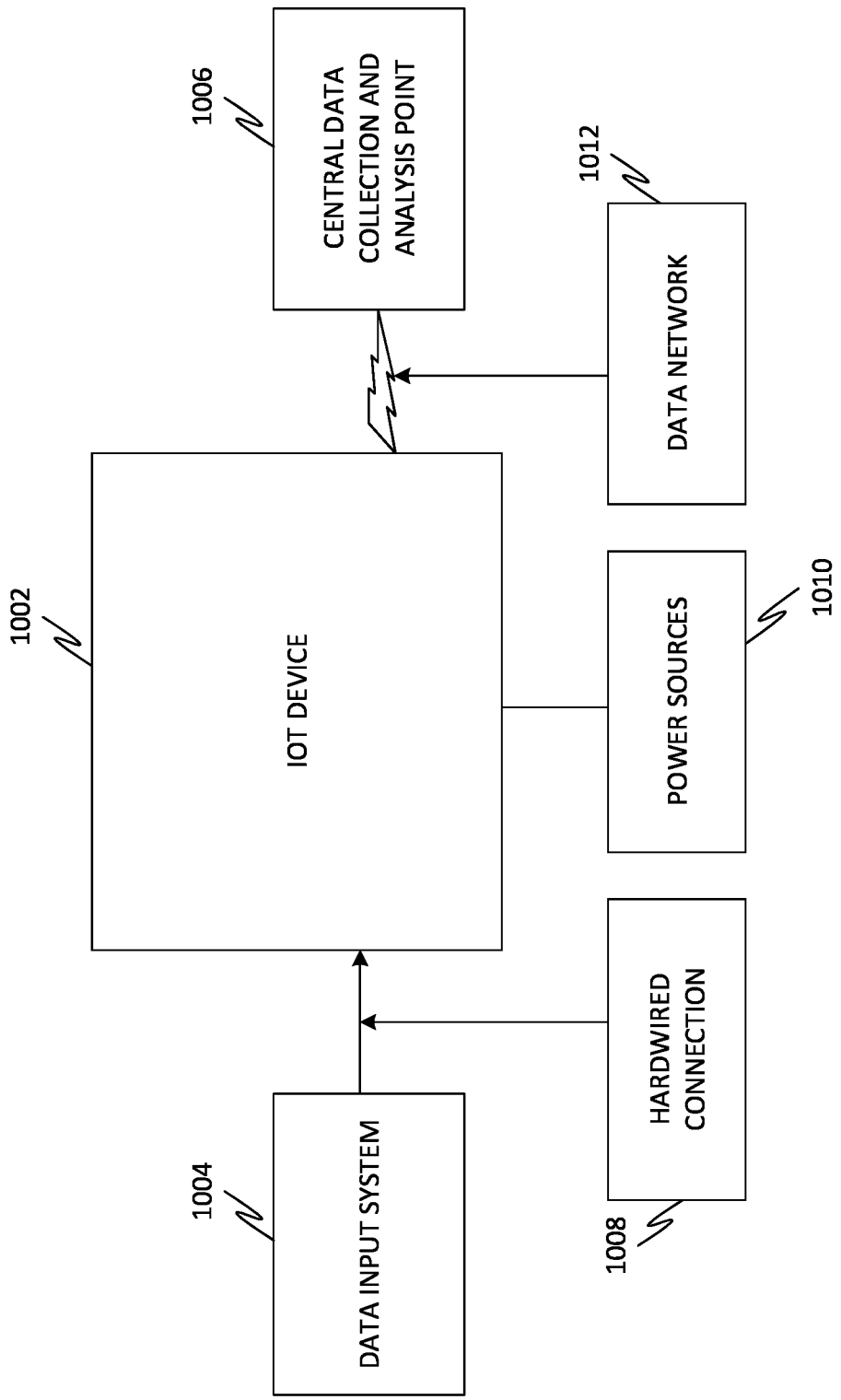
FIG. 10 illustrates a data connection between a data input system, an IoT device, and an assessment system, in accordance with some embodiments.

FIG. 10 illustrates a data connection between a data input system 1004, an IoT device 1002, and an assessment system, in accordance with some embodiments. Accordingly, the IoT device 1002 may be connected to the data input system 1004 using a hard-wired connection 1008. Further, the IoT device 1002 may be commercially available containing raw data port, ethernet, A to D converter, data compression, GPS, tri-band cellular radio (3G/4G/5G) satellite, clock, Bluetooth™, temperature reader, barometric pressure, and so on. Further, the IoT device 1002 may be powered by power sources 1010. Further, the power sources 1010 may include solar/wind power sources. Further, the power sources 1010 may include a lithium-ion battery. Further, the data input system 1004 may include a wideband audio device, a laser interferometry device, or a laser matrix device. Further, the IoT device 1002 may send a sample of recorded audio over a data network 1012 (such as a public cellular/satellite network) to a central data collection and analysis point 1006 (or central point). The signals from the data input system 1004 may be communicated over the network connected to the assessment system (such as the assessment system 210) for evaluation. Further, the data network 1012 may include conventional data communications network, including microwave, telephone line, satellite, or recorded magnetic medium, appropriate for transferring any of these signals in any or each of real-time, time delay, timeshare, or batch formats may be used.

The network may enable the data input system 1004 to communicate with the assessment system. Some embodiments enable communication via cellular and/or Wi-Fi networks. Some embodiments enable communication via the Internet. Several embodiments enable wired communication between the data input system 1004 and the assessment system. The network can include the following communication means radio, Wi-Fi (e.g., wireless local area network), cellular, Internet, Bluetooth, telecommunication, electromagnetic, infrared, light, sonic, and microwave. Other communication means are used by some embodiments.

Figure 11:
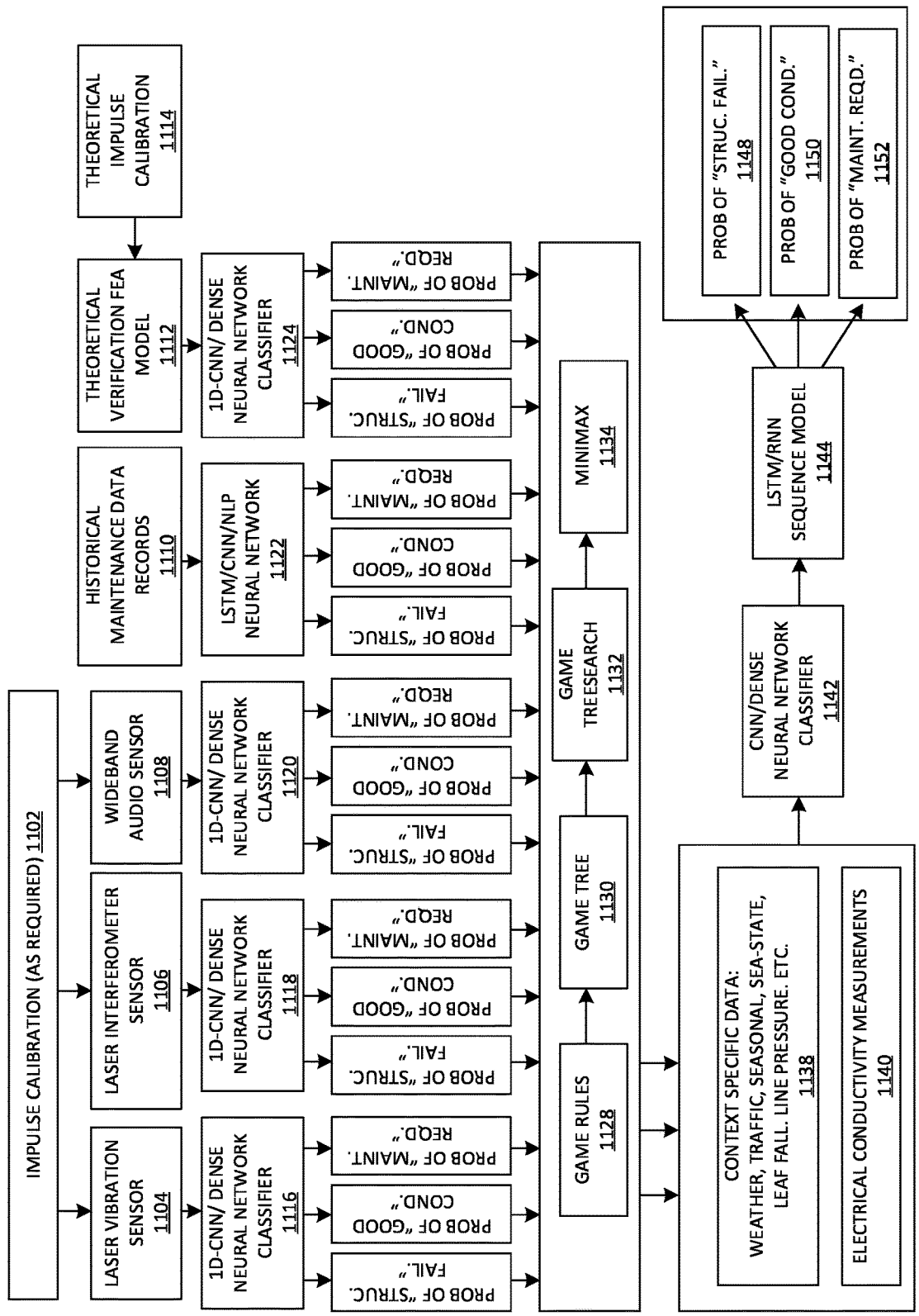
FIG. 11 illustrates an assessment system with minimax evaluation associated with the system, in accordance with some embodiments.

FIG. 11 illustrates an assessment system with minimax evaluation associated with the system 200, in accordance with some embodiments. Further, an assessment system (such as the assessment system 210) associated with the system 200 may include a one-dimensional convolutional neural network (1D-CNN)/dense neural network classifier and a Long Short-Term Memory (LSTM)/Convolutional Neural Network (CNN)/Natural Language Processing (NLP) neural network. The assessment system may be configured to analyze structural characteristic information received from the input data system and produce an assessment such as "Structural Failure," "Good Condition" or "Maintenance Reqd."

Further, the assessment system may receive a first data from a laser vibration sensor 1104. Further, the first data from a laser vibration sensor 1104 may be analyzed using a first 1D-CNN classifier and neural network classifier 1116 to generate at least one first probability associated with the first data. Further, the at least one first probability may include a probability of structural fail, a probability of good condition, a probability of maintenance required. Further, the laser vibration sensor 1104 may receive data associated with impulse calibration 1102. Further, the assessment system may receive a second data from a laser interferometer sensor 1106. Further, the second data from the laser interferometer sensor 1106 may be analyzed using a second 1D-CNN classifier and neural network classifier 1118 to generate at least one second probability associated with the second data. Further, the at least one second probability may include a probability of structural fail, a probability of good condition, a probability of maintenance required. Further, the laser interferometer sensor 1106 may receive data associated with the impulse calibration 1102. Further, the assessment system may receive a third data from a wideband audio sensor 1108. Further, the third data from the wideband audio sensor 1108 may be analyzed using a third 1D-CNN classifier and neural network classifier 1120 to generate at least one third probability associated with the third data. Further, the at least one third probability may include a probability of structural fail, a probability of good condition, a probability of maintenance required. Further, the wideband audio sensor 1108 may receive data associated with the impulse calibration 1102. Further, the assessment system may receive a fourth data from historical maintenance data records 1110. Further, the fourth data from the historical maintenance data records 1110 may be analyzed using a LSTM/CNN/NLP and neural network classifier 1122 to generate at least one fourth probability associated with the fourth data. Further, the at least one fourth probability may include a probability of structural fail, a probability of good condition, a probability of maintenance required. Further, the assessment system may receive a fifth data from a theoretical verification FEA model 1112. Further, the fifth data from the theoretical verification FEA model 1112 may be analyzed using a fifth 1D-CNN classifier and neural network classifier 1124. Further, the theoretical verification FEA model 1112 may receive data associated with theoretical impulse calibration 1114. Further, the assessment system may analyze at least one of the first data, the second data, the third data, the fourth data, and the fifth data using a game tree algorithm 1130 based on game rules 1128. Further, the game tree algorithm 1130 may be associated with a game tree search 1132. Further, the assessment system may be associated with a minimax rule 1134. Further, the game tree algorithm 1130 may enable error minimization. Further, at 1138, the assessment system may receive context-specific data that may include data associated with weather, traffic, season, sea-state, leaf fall, line pressure, etc. Further, at 1140, the assessment system may receive electrical conductivity measurements. Further, the context-specific data may be analyzed using CNN/Dense Neural network Classifier 1142. Further, data may flow from the CNN/Dense Neural network Classifier 1142 to an LSTM/RNN sequence model 1144. Further, at 1148, the assessment system may determine a probability of structure fail. Further, at 1150, the assessment system may determine a probability of good condition. Further, at 1152, the assessment system may determine a probability of maintenance required.

In an embodiment, the assessment system may include minimax to minimize errors. For example, a generic model of a given asset class is generated using a finite element analysis (FEA) mesh, using proprietary software such as Ansys. This model is stimulated by an impulse as would be expected during normal exposure of the asset to the environment or load. A statistical, time-series, vibrational response of the model is obtained, exported to, and used to train the same neural network as a separate, independent neural network. First, the model is stimulated as if there were no defects in the structure. Subsequently, deliberate failures of varying severity and/or location are injected randomly into the asset class digital model to represent different kinds of failure. An additional set of data points is obtained from maintenance records and analyzed using a neural network to discover common themes or failure mechanisms over time. An LSTM neural network, or similar, can be used. Further, Time Series Classification (TSC) Neural Networks may also be used. Further, a Frame Capture Comparison (FCC) method may be used, where a short duration data burst is analyzed, using an FFT algorithm. The resulting distribution is stored as an image. Second and subsequent (up to about 100) FFT images are captured at intervals between every one second and one hour and overlaid upon one another, creating an image specific to the context. After the overlay of the first image and after the passing of a set period, depending on the resonant characteristics of the structure or building in question (this period may be minutes, hours, or days) the process is repeated until a series of such images are obtained. A Neural Network image classifier is trained on the data so obtained to compare the likeness of one image to another. When the images are significantly different, this may be an indication of an underlying change in the resonant characteristics of the structure or building being analyzed. Lastly, the final data set is obtained from the sensor network. Each data stream will yield a probability, obtained from the neural network, that represents the probability of failure in the asset, or whether it would require maintenance or whether the asset would be deemed OK. The objective is to minimize the maximum error of misclassification, using combinations of this data in predictions of asset failure. Combinatorial logic rules dictate how these quantities are compared. For example, if one deliberate fault is injected into the verification model AND the probability of failure is less than 60%, as obtained from the retrieved real sensor data, OR the probability of failure based on analysis of maintenance reports is greater than 75%, then the data obtained from the sensor network is likely to be in error by more than 50% and so the real data network would require optimization. A game tree can be generated by an algorithm specific to the class of rules as defined. Once the tree is constructed, it is searched using a known search algorithm—for example, alpha-beta search—for a solution. The solution accepted as optimal is the minimax solution, which minimizes the maximum error that is contained within the data described. This FEA is stimulated with a theoretical impulse, representative of what the real-world example of the asset of that class would experience, which would include a model of the sensor types described above. Random noise data is injected into the model to minimize errors. The data so obtained is used to train a neural network. The classified responses can be "Good Condition (GC)," "Requiring Maintenance (RM)" or "Structural Failure (SF)."

The assessment system may also be configured to consider secondary input such as context-specific data (weather, traffic, seasonal, sea-state, leaf-fall, line pressure, etc.) or electrical conductivity measurements. After considering the secondary data, the assessment system may go through the network again before making a final assessment of classified responses such as "Structural Failure," "Good Condition" or "Maintenance Reqd."

The output system may include any communication device that can be configured to provide a work order so that an asset inspection will take place. The communication device may enable a remotely located person to see an output display sent from the assessment system. Communication devices can include computers, laptops, tablets, mobile devices, smartphones, cellular phones, and wireless devices (e.g., cars with wireless communication). Communication between a remotely located person and the output system can occur via the Internet, cellular networks, telecommunication networks, and wireless networks.

In an embodiment, the data input system may be configured to detect a stress event on an asset of interest. For example, the microphone of the data input system may be fixed semi-permanently or permanently to a structure. Various stress events such as passing vehicles, wind effects, natural movement, and creepage of the asset will generate unique signals specific to the structure such as reflections, resonances, and sounds. The unique signal can be passed to a recording and internet access system that may be permanently located at each structure. As described above, this recording and internet access system will be a low-cost, widely commercially available "internet of things" (IoT) device that may incorporate analog-to-digital conversion at an appropriate sampling rate and be equipped with GPS to enable location, date, and time stamp. The IoT device may be configured to send a sample of captured data over a cellular radio-data network to a central point with a GPS time, date, and location stamp.

Figure 12:
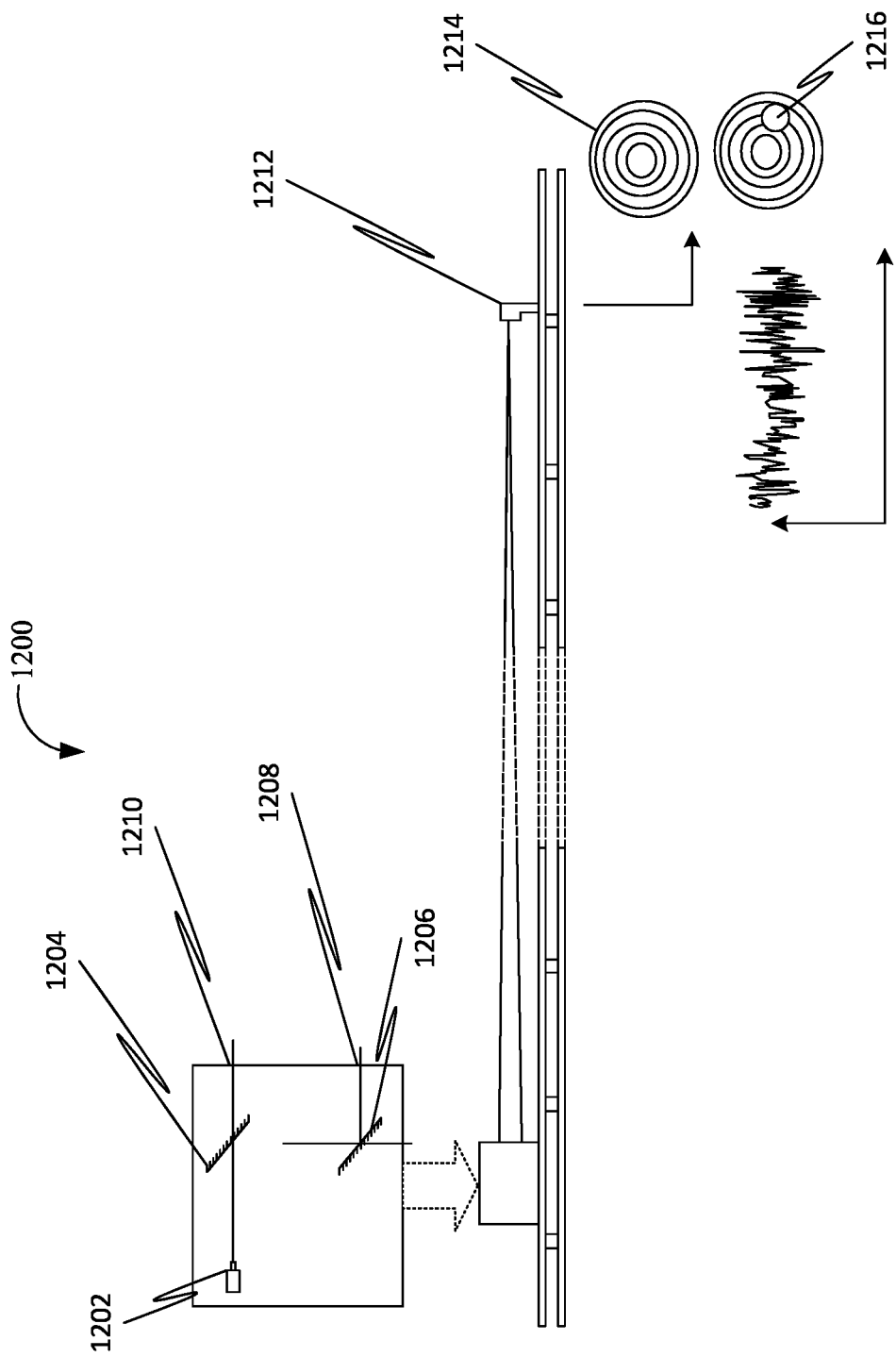
FIG. 12 is a schematic of an interferometry system, in accordance with some embodiments.

FIG. 12 is a schematic of an interferometry system 1200, in accordance with some embodiments. Accordingly, the interferometry system 1200 (such as the interferometry device 402) may include an infra-red laser diode 1202 and a semi-silvered mirror 1204. Further, the semi-silvered mirror 1204 may be turnable. Further, the interferometry system 1200 may include a turn-able full silvered mirror 1206.

Further, the interferometry system 1200 may include a PIN photodiode 1212 (such as the at least one sensor 204). Further, the interferometry system 1200 may include apertures 1208-1210. Further, the infra-red laser diode 1202 may generate an infra-red laser diode beam. Further, the infra-red laser diode beam may be 780 m 10 mW AI-Ga-AS infrared laser diode e.g. LD780A10C16. Further, the infra-red laser diode beam may be directed toward the semi-silvered mirror 1204 that splits the infra-red laser diode beam into two identical components. Each component may take a slightly different path, resulting in a phase difference; one is directed toward a sensor at a point on a structure, while the other is directed to converge at the same point on the asset (e.g., wind turbine support column, bridge, electricity transmission pylon, gas turbine, etc.). As the beams converge, interference fringes are apparent in the recombined components. These fringes are unstable because of the expansion and contraction of the structure, vibrations (including low-frequency sound), routine impacts, resonance phenomena, and the effects of load-bearing, etc. As the fringes traverse an active region on a photodiode under the influence of these forces, and for any given specific structure, a time-series statistical variation of fringes (characteristically specific to that asset in that duty) can be obtained. This time-series information is passed to a neural network, via the IoT device described above, to determine trends in data and to extract features in the manner described. This data may then be passed to the game algorithm to reduce the error rates in predictions. Further, the interferometry system 1200 may be associated with observed interference 1214. Further, the interferometry system 1200 may be associated with observed interference patterns overlaid with the detector position 1216.

The fringe pattern obtained will be unstable, because of vibrations in the asset structure. Vibrations will lead to small but detectable variations in path length and hence a time-variant signal will arise as the dark and light fringes pass over the center of the PIN photodiode 1212 (such as a PIN photodetector). This signal is analyzed using the neural network identified above.

Figure 13:
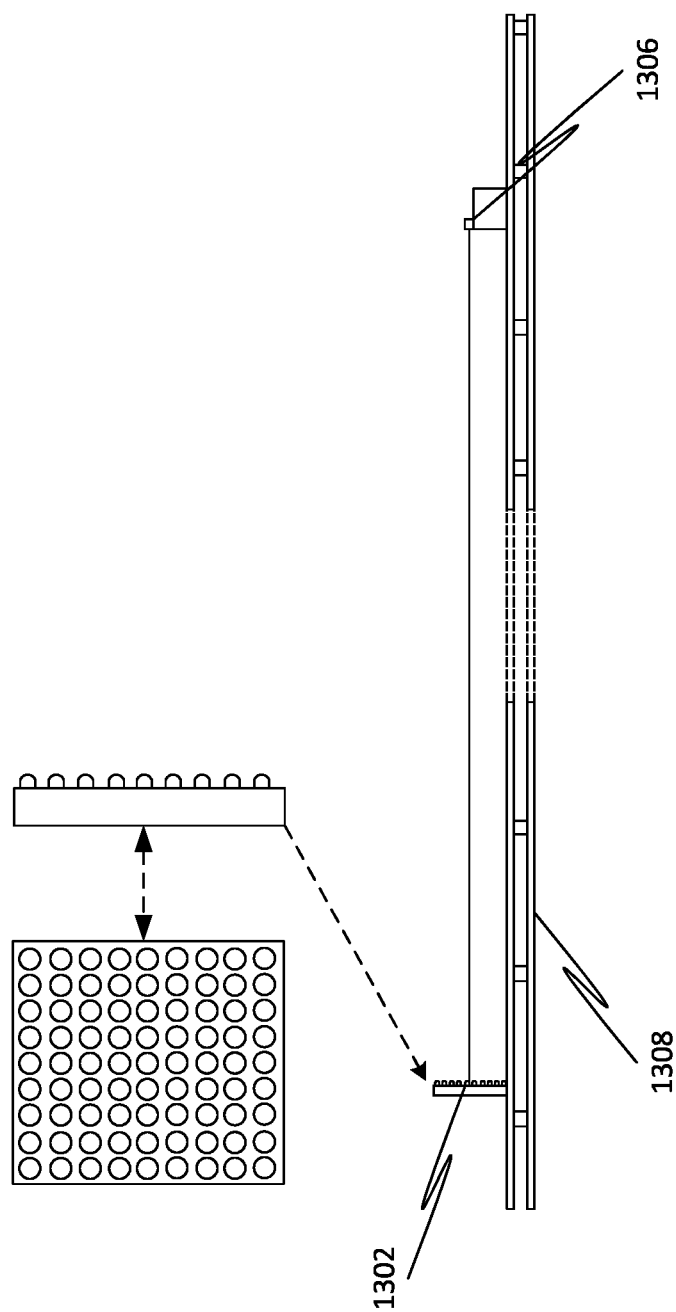
FIG. 13 illustrates infrared photodiodes and a laser device, in accordance with some embodiments.

FIG. 13 illustrates infrared photodiodes 1302 and a laser device 1306, in accordance with some embodiments. Accordingly, the infrared photodiodes 1302 (such as the at least one sensor 202) and the laser device 1306 may be associated with the system 200. Further, the infrared photodiodes 1302 and the laser device 1306 (such as the laser device 502) may be configured for detecting modes of vibration of a specific asset class. Further, the infrared photodiodes 1302 may be 9×9 Si P-I-N Photodiode Matrix: each low-cost Hamamatsu S677501. Further, the laser device 1306 may be 780 10 mW AI-Ga-AS Infrared laser diode, e.g. LD780A10C16 with a power supply unit. Further, the 780 nm IR laser beam may be nominally directed toward the center of the PIN photodiode array. As a bridge component 1308 is periodically stressed and de-stressed, the laser beam will deflect stochastically about a mean position. Further, a characteristic time-series response for any unique asset will result and will be representative of a given range of input impulses.

Further, the infrared photodiodes 1302 may be attached to an asset and the laser device 1306 attached to the structure in a permanent or semi-permanent manner and configured to detect the modes of vibration of a specific asset class. The laser beam from the laser device 1306 can be directed toward the infra-red photodiodes 1302 attached to the asset. The laser beam will be deflected according to the vibrational modes within the asset, and the laser beam will illuminate an individual photodiode in the array for a short period. The stochastic nature of the vibration will be captured first by the photodiode array as the laser beam traverses it, then by a neural network that captures the time-varying pattern. The pattern of illumination will depend on the vibration mode in question and the type of stimulus that the asset is undergoing. If it is known that the asset is sound, through prior inspections or maintenance reports, the vibrational pattern will be labeled as per the scheme described above as being fault- or failure-free, and the weights and biases within the neural network will learn this specific pattern. When exposed to real data, the same response will indicate the same condition as a given, specific, individual asset is expected to vibrate in the same way unless unusual prevailing environmental conditions are present, if there are excess loads or if there is an impending failure in the asset. Detecting changes in this pattern is key to ensuring the safety and durability of the asset. Inspection and maintenance can be dispatched once an unusual signal is detected.

Figure 14:
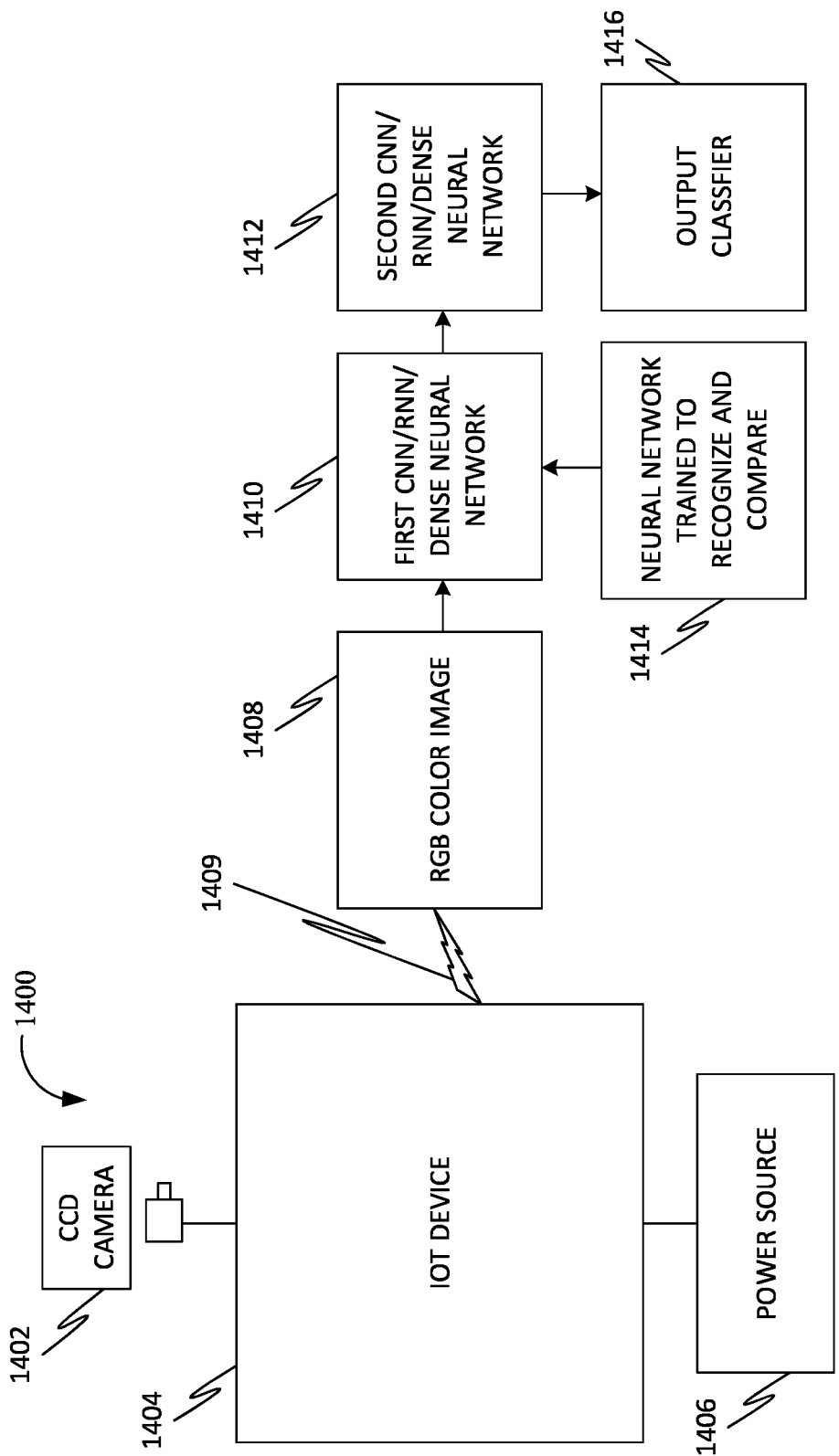
FIG. 14 illustrates a camera system associated with the system, in accordance with some embodiments.

FIG. 14 illustrates a camera system 1400 associated with the system 200, in accordance with some embodiments. Accordingly, the camera system 1400 may be configured for evaluating the movement of a structure or a quantity of a substance. Further, the camera system 1400 may include a CCD camera 1402. Further, the camera system 1400 may include an IoT device 1404. Further, the camera system 1400 may include a power source 1406. Further, at 1408, the IoT device 1404 may transmit an RGB color image to a central analysis point for classification using a first CNN/RNN/Dense Neural Network 1410. Further, the IoT device 1404 may transmit the RGB color image using public cellular/satellite network 1409. Further, at 1414, a neural network may be trained to recognize and compare current against the previous image. Further, after the first CNN/RNN/Dense Neural Network 1410, the RGB color image may be analyzed using a second CNN/RNN/Dense Neural Network 1412. Further, the camera system 1400 may be associated with an output classifier 1416. Further, the IoT device 1404 may be configured to capture an image of a structure, object, feature, or substance. The captured image in the camera system 1400, which may be an RGB color image, can be stored digitally in a data input system. The captured image can be passed to a neural network, via the IoT device 1404 described above, to determine trends in data and to extract features in the manner described. Further, the IoT device 1404 may be commercially available containing raw data port, ethernet, A to D converter, data compression, GPS, tri-band cellular radio (3G/4G/5G) satellite, clock, Bluetooth™ temperature reader, barometric pressure, and so on. Further, the IoT device 1404 may be powered by power source 1406. Further, the power source 1406 may include solar/wind power source 1406. Further, the power source 1406 may include a lithium-ion battery.

In an embodiment, the captured image may be compared with either one of i) an image of the object or substance captured at some previous point, ii) a library image of a substance or class of objects, etc. to assess whether it has undergone any distortion or change in composition. A convolutional neural network (CNN), or recurrent neural network (RNN), or a combination or compound of such networks can be trained with the previously captured images or library images. If a change is detected in the captured image, then the fact and nature of the change can be identified by the neural network. For example, if distortion is detected in the captured image of a structure, the neural network will be able to discern the type and nature of such distortion. Further, if the captured image, captured by the CCD-type camera device and stored as described, includes a quantity of substance, then by comparison with a library of images and by comparison with a reference object to set the scale of the captured image, the volume of the substance can be estimated directly from an image classifier. If the density of the substance is known, then the mass or weight of the substance can also be determined from the captured image.

Figure 15:
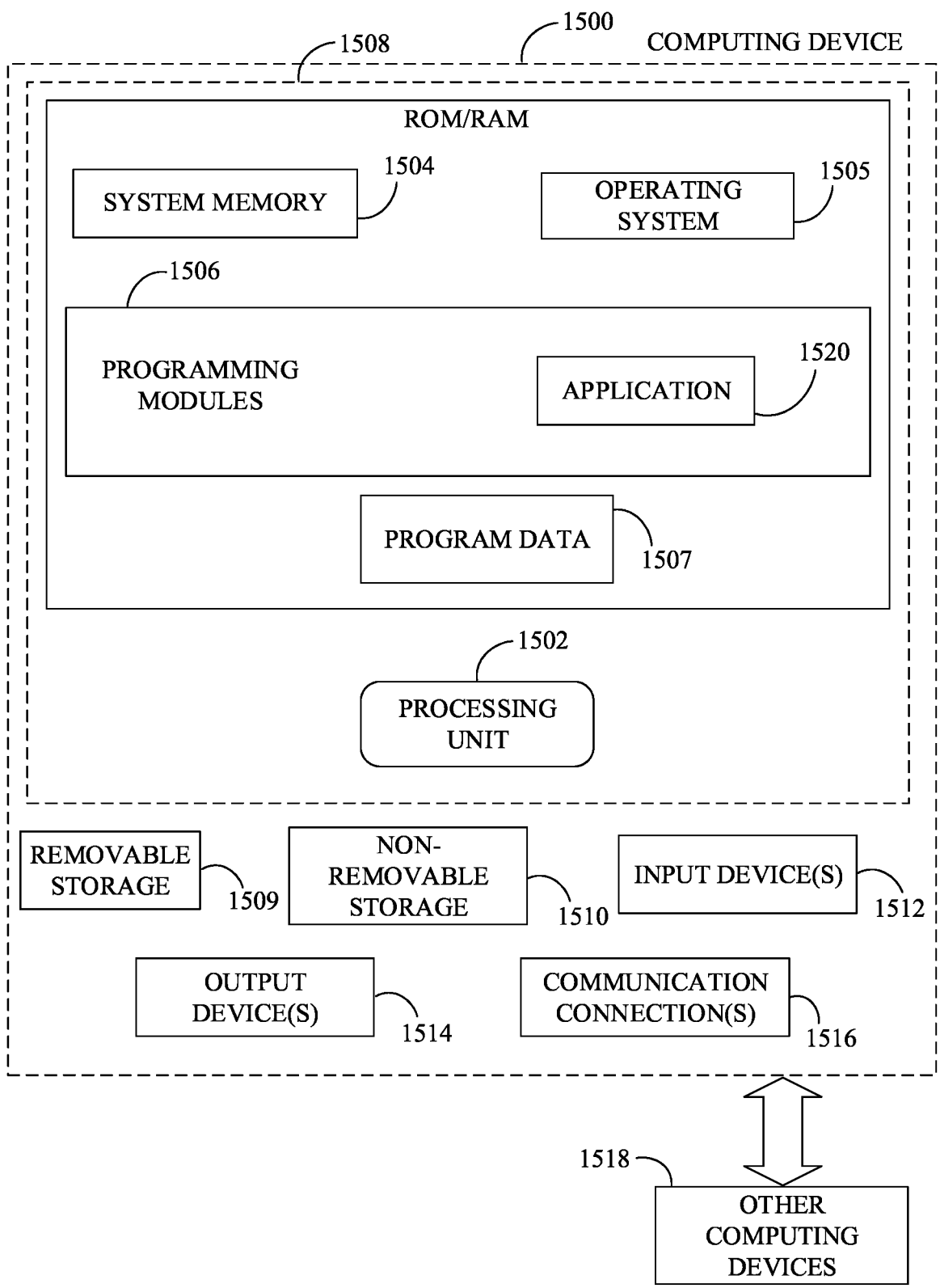
FIG. 15 is a block diagram of a computing device for implementing the methods disclosed herein, in accordance with some embodiments.

With reference to FIG. 15, a system consistent with an embodiment of the disclosure may include a computing device or cloud service, such as computing device 1500. In a basic configuration, computing device 1500 may include at least one processing unit 1502 and a system memory 1504. Depending on the configuration and type of computing device, system memory 1504 may comprise, but is not limited to, volatile (e.g. random-access memory (RAM)), non-volatile (e.g. read-only memory (ROM)), flash memory, or any combination. System memory 1504 may include operating system 1505, one or more programming modules 1506, and may include a program data 1507. Operating system 1505, for example, may be suitable for controlling computing device 1500's operation. In one embodiment, programming modules 1506 may include image-processing module, machine learning module. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by a removable storage 1509 and a non-removable storage 1510. Computer storage media may include volatile and non-volatile, removable and non-removable media implemented in any method or technology for storage of information, such as computer-readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1500. Any such computer storage media may be part of device 1500. Computing device 1500 may also have input device(s) 1512 such as a keyboard, a mouse, a pen, a sound input device, a touch input device, a location sensor, a camera, a biometric sensor, etc. Output device(s) 1514 such as a display, speakers, a printer, etc. may also be included. The aforementioned devices are examples and others may be used.

Computing device 1500 may also contain a communication connection 1516 that may allow device 1500 to communicate with other computing devices 1518, such as over a network in a distributed computing environment, for example, an intranet or the Internet. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., application 1520) may perform processes including, for example, one or more stages of methods, algorithms, systems, applications, servers, databases as described above. The aforementioned process is an example, and processing unit 1502 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A system for facilitating assessment of a physical asset, the system comprising:
   at least one device disposable on at least one location of the physical asset, wherein the at least one device comprises:
     at least one sensor configured for generating at least one information associated with at least one characteristic of the physical asset, wherein the at least one sensor is further configured for detecting at least one event associated with the physical asset, wherein the generating of the at least one information is based on the detecting, wherein the at least one information comprises at least one of at least one spatial identifier of the at least one event and at least one temporal identifier of the at least one event;
     at least one communication interface communicatively coupled with the at least one sensor, wherein the at least one communication interface is configured for communicating with an assessment system using at least one communication channel, wherein the at least one communication interface is configured for transmitting the at least one information to the assessment system; and
     at least one power source electrically coupled with the at least one sensor and the at least one communication interface, wherein the at least one power source is configured for electrically powering the at least one sensor and the at least one communication interface;
   the assessment system communicatively coupled with the at least one device, wherein the assessment system comprises:
     a communication device configured for:
       receiving the at least one information from the at least one communication interface; and
       transmitting an assessment to at least one user device;
     a processing device communicatively coupled with the communication device, wherein the processing device is configured for:
       analyzing the at least one information; and
       generating the assessment of the physical asset based on the analyzing of the at least one information; and
     a storage device communicatively coupled with the processing device, wherein the storage device is configured for storing the at least one information and the assessment; and
   at least one stimulator device being communicatively coupled with the at least one communication device, wherein the at least one communication device is further configured for transmitting at least one schedule to the at least one stimulator device, wherein the at least one stimulator device is configured for:
     generating at least one stimulus, wherein the generating of the at least one stimulus is based on the at least one schedule, wherein the storage device is further configured for retrieving the at least one schedule; and
     delivering the at least one stimulus to the physical asset based on the generating of the at least one stimulus, wherein the physical asset generates at least one response based on the at least one stimulus and the at least one characteristic, wherein the generating of the at least one information is based the at least one response, wherein the at least one information is associated with the at least one response.

2. The system of claim 1, wherein the communication device is further configured for:
   receiving at least one request from at least one first user device; and
   transmitting at least one command to the at least one stimulator device, wherein the generating of the at least one stimulus is based on the at least one command, wherein the processing device is further configured for:
   analyzing the at least one request; and
   generating the at least one command based on the analyzing of the at least one request.

3. The system of claim 1 further comprising an interferometry device configured for generating two beams of light, wherein the two beams comprise a first beam and a second beam, wherein the first beam is directed towards the at least one sensor through a first path, wherein the second beam is directed towards the at least one sensor through a second path, wherein the first path and the second path are dissimilar, wherein the first beam and the second beam converges on the at least one sensor forming at least one interference fringe, wherein the at least one interference fringe corresponds to at least one response generated by the physical asset based on at least one stimulus receivable by the physical asset and the at least one characteristic of the physical asset, wherein the at least one response comprises at least one vibration generated by the physical asset, wherein the generating of the at least one information is based on the forming of the at least one interference fringe.

4. The system of claim 1 further comprising a laser device configured for generating a laser beam, wherein the laser beam is directed towards the at least one sensor, wherein the laser beam illuminates the at least one sensor forming at least one illumination pattern, wherein the at least one illumination pattern corresponds to at least one response generated by the physical asset based on at least one stimulus receivable by the physical asset and the at least one characteristic of the physical asset, wherein the at least one response comprises at least one vibration generated by the physical asset, wherein the generating of the at least one information is based on the forming of the at least one illumination pattern.

5. The system of claim 1 further comprising a radar device configured for:
 generating radio waves; and
 directing the radio waves towards the physical asset, wherein the physical asset generates first radio waves by at least one of transmitting and absorbing at least one portion of the radio waves based on at least one structural characteristic of the at least one characteristic of the physical asset, wherein the first radio waves are directed towards the at least one sensor, wherein the generating of the at least one information is based on the first radio waves.

6. The system of claim 1, wherein the analyzing of the at least one information is based on at least one artificial intelligence model, wherein the at least one artificial intelligence model is configured for determining a probability for each assessment option of a plurality of assessment options associated with the physical asset, wherein the generating of the assessment is based on the determining of the probability of the each assessment option, wherein the storage device is further configured for storing the at least one artificial intelligence model.

7. The system of claim 1, wherein the at least one information comprises at least one asset identifier, wherein the storage device is further configured for retrieving at least one historical maintenance information based on the at least one asset identifier, wherein the at least one historical maintenance information is associated with at least one historical response generated by the physical asset, wherein the processing device is further configured for analyzing the at least one historical maintenance information, wherein the generating of the assessment is further based on the analyzing of the at least one historical maintenance information.

8. The system of claim 1, wherein the at least one device is associated with at least one geographical location, wherein at least one response generated by the physical asset based on at least one stimulus receivable by the physical asset and the at least one characteristic comprises at least one environmental response generated by at least one environmental component of an environment of the physical asset, wherein the at least one environmental component is associated the at least one geographical location, wherein the assessment comprises an environmental assessment of the at least one geographical location.

9. The system of claim 1, wherein the at least one device further comprises at least one environment sensor, wherein the at least one environment sensor is communicatively coupled with the at least one communication interface, wherein the at least one environment sensor is configured for generating at least one environmental information based on at least one environmental condition associated with an environment of the physical asset, wherein the at least one communication interface is configured for transmitting the at least one environmental information to the assessment system, wherein the communication device is further configured for receiving the at least one environmental information from the at least one communication interface, wherein the processing device is further configured for analyzing the at least one environmental information, wherein the generating of the assessment is further based on the analyzing of the at least one environmental information.

10. The system of claim 1, wherein the communication device is further configured for:
 receiving at least one first request from at least one second user device; and
 transmitting at least one first command to the at least one communication interface, wherein the generating of the at least one information is based on the at least one first command, wherein the processing device is further configured for:
 analyzing the at least one first request; and
 generating the at least one first command based on the analyzing of the at least one first request.

11. A system for facilitating assessment of a physical asset, the system comprising:
 at least one device disposable on at least one location of the physical asset, wherein the at least one device comprises:
  at least one sensor configured for generating at least one information associated with at least one characteristic of the physical asset;
  at least one environment sensor configured for generating at least one environmental information based on at least one environmental condition associated with an environment of the physical asset;
  at least one communication interface communicatively coupled with the at least one sensor and the at least one environment sensor, wherein the at least one communication interface is configured for communicating with an assessment system using at least one communication channel, wherein the at least one communication interface is configured for transmitting the at least one information and the at least one environmental information to the assessment system; and
  at least one power source electrically coupled with the at least one sensor, the at least one environment sensor, and the at least one communication interface, wherein the at least one power source is configured for electrically powering the at least one sensor, the at least one environment sensor, and the at least one communication interface; and
 the assessment system communicatively coupled with the at least one device, wherein the assessment system comprises:
  a communication device configured for:
   receiving the at least one information and the at least one environmental information from the at least one communication interface; and transmitting an assessment to at least one user device;
a processing device communicatively coupled with the communication device, wherein the processing device is configured for:
analyzing the at least one information and the at least one environmental information; and
generating the assessment of the physical asset based on the analyzing of the at least one information and the at least one environmental information; and
a storage device communicatively coupled with the processing device, wherein the storage device is configured for storing the at least one information and the assessment.

12. The system of claim 11 further comprising at least one stimulator device configured for:
generating at least one stimulus; and
delivering the at least one stimulus to the physical asset based on the generating of the at least one stimulus, wherein the physical asset generates at least one response based on the at least one stimulus and the at least one characteristic, wherein the generating of the at least one information is based the at least one response, wherein the at least one information is associated with the at least one response.

13. The system of claim 12, wherein the communication device is communicatively coupled with the at least one stimulator device, wherein the communication device is further configured for:
receiving at least one request from at least one first user device; and
transmitting at least one command to the at least one stimulator device, wherein the generating of the at least one stimulus is based on the at least one command, wherein the processing device is further configured for:
analyzing the at least one request; and
generating the at least one command based on the analyzing of the at least one request.

14. The system of claim 12, wherein the communication device is communicatively coupled with the at least one stimulator device, wherein the communication device is further configured for transmitting at least one schedule to the at least one stimulator device, wherein the generating of the at least one stimulus is based on the at least one schedule, wherein the storage device is further configured for retrieving the at least one schedule.

15. The system of claim 11, wherein the at least one information comprises at least one asset identifier, wherein the storage device is further configured for retrieving at least one historical maintenance information based on the at least one asset identifier, wherein the at least one historical maintenance information is associated with at least one historical response generated by the physical asset, wherein the processing device is further configured for analyzing the at least one historical maintenance information, wherein the generating of the assessment is further based on the analyzing of the at least one historical maintenance information.

16. The system of claim 11, wherein the at least one device is associated with at least one geographical location, wherein at least one response generated by the physical asset based on at least one stimulus receivable by the physical asset and the at least one characteristic comprises at least one environmental response generated by at least one environmental component of the environment of the physical asset, wherein the at least one environmental component is associated the at least one geographical location, wherein the assessment comprises an environmental assessment of the at least one geographical location.

17. The system of claim 11, wherein the communication device is further configured for:
receiving at least one first request from at least one second user device; and
transmitting at least one first command to the at least one communication interface, wherein the generating of the at least one information is based on the at least one first command, wherein the processing device is further configured for:
analyzing the at least one first request; and
generating the at least one first command based on the analyzing of the at least one first request.

* * * * *